(12) United States Patent
Kawashima et al.

(10) Patent No.: US 9,909,002 B2
(45) Date of Patent: Mar. 6, 2018

(54) RESIN COMPOSITION, CROSS-LINKED PRODUCT, AND METHOD FOR MANUFACTURING CROSS-LINKED PRODUCT

(71) Applicant: Sumitomo Chemical Company, Limited, Tokyo (JP)

(72) Inventors: Yasutoyo Kawashima, Ichihara (JP); Yoshinobu Nozue, Tokyo (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/302,075

(22) PCT Filed: Apr. 8, 2015

(86) PCT No.: PCT/JP2015/061523
§ 371 (c)(1),
(2) Date: Oct. 5, 2016

(87) PCT Pub. No.: WO2015/156416
PCT Pub. Date: Oct. 15, 2015

(65) Prior Publication Data
US 2017/0121516 A1 May 4, 2017

(30) Foreign Application Priority Data

Apr. 9, 2014 (JP) ................. 2014-080031
Nov. 26, 2014 (JP) ................. 2014-238556
Nov. 28, 2014 (JP) ................. 2014-241451

(51) Int. Cl.
*C08L 23/24* (2006.01)
*C08J 3/24* (2006.01)
*C08J 9/10* (2006.01)

(52) U.S. Cl.
CPC .............. *C08L 23/24* (2013.01); *C08J 3/24* (2013.01); *C08J 9/103* (2013.01); *C08J 2203/04* (2013.01); *C08L 2205/025* (2013.01)

(58) Field of Classification Search
CPC ....... C08L 23/14; C08L 2205/025; C08J 3/24; C08J 9/103; C08J 2203/04
See application file for complete search history.

(56) References Cited

U.S. PATENT DOCUMENTS

| 2003/0087976 A1* | 5/2003 | Bambara et al. | ......... C08F 8/00 521/144 |
| 2005/0119374 A1 | 6/2005 | Minami et al. | |
| 2007/0079825 A1 | 4/2007 | Sera et al. | |
| 2009/0018288 A1 | 1/2009 | Aburatani et al. | |
| 2010/0040953 A1* | 2/2010 | Takata et al. | ....... H01M 2/1653 429/249 |
| 2013/0317166 A1 | 11/2013 | Kanamaru et al. | |
| 2014/0275462 A1* | 9/2014 | Yang et al. | ............. C08F 10/02 526/352 |

FOREIGN PATENT DOCUMENTS

| EP | 1681333 A1 | 7/2006 |
| JP | 2006131784 A | 5/2006 |
| JP | 2008543978 A | 12/2008 |
| JP | 2014040563 A | 3/2014 |
| JP | 2015091903 A | 5/2015 |
| WO | 03070790 A1 | 8/2003 |
| WO | 2005040300 A1 | 5/2005 |
| WO | 2006102154 A2 | 9/2006 |
| WO | 2012070240 A1 | 5/2012 |
| WO | 2012161278 A1 | 11/2012 |

OTHER PUBLICATIONS

Int'l Search Report dated Jul. 14, 2015 in Int'l Application No. PCT/JP2015/061523.
Int'l Preliminary Report on Patentability dated Oct. 12, 2016 in Int'l Application No. PCT/JP2015/061523.
Extended Search Report dated Oct. 30, 2017 in EP Application No. 15776385.5.
Starck et al, "Thermal Properties of Ethylene/Long Chain A-Olefin Copolymers Produced by Metallocenes," European Polymer Journal, vol. 38, pp. 97-107 (2002).
MDI Resource, "Understanding of Injection Molded Flexible Foam," (Jan. 1, 2010), downloaded from web page: Url:www.mdiproducts.com/ . . . /mdi-understanding-flexible-foam.pdf, Download date:Oct. 2017, original posting date: unknown, 8 pages.

* cited by examiner

*Primary Examiner* — Nathan M Nutter
(74) *Attorney, Agent, or Firm* — Panitch Schwarze Belisario & Nadel LLP

(57) ABSTRACT

There are provided a resin composition capable of affording a cross-linked foam excellent in heat storage performance, a cross-linked product of the resin composition, and a method for producing the cross-linked product. Specifically, there is provided a resin composition containing an olefin polymer comprising a main chain containing monomer units derived from ethylene and branch chains having 5 or more carbon atoms, the number of the branch chains being within the range of 20 chains to 40 chains per 1000 carbon atoms constituting the olefin polymer, and having a melting peak temperature measured with DSC of within the range of 10° C. to 50° C., a crystallization peak temperature measured with DSC of within the range of 0° C. to 40° C., and a melt enthalpy measured with DSC of 50 J/g or more, and an olefin polymer having a melting peak temperature measured with DSC of within the range of 50° C. to 180° C.

3 Claims, No Drawings

US 9,909,002 B2

RESIN COMPOSITION, CROSS-LINKED PRODUCT, AND METHOD FOR MANUFACTURING CROSS-LINKED PRODUCT

CROSS-REFERENCE TO RELATED APPLICATION

This application is a Section 371 of International Application No. PCT/JP2015/061523, filed Apr. 8, 2015, which was published in the Japanese language on Oct. 15, 2015, under International Publication No. WO 2015/156416 A1, and the disclosure of which is incorporated herein by reference.

TECHNICAL FIELD

The present invention relates to a resin composition, a cross-linked product (e.g., a cross-linked molded article or a cross-linked foam) of the resin composition, and a method for producing the cross-linked product.

BACKGROUND ART

Heretofore, use of a board containing a material having heat storage performance has been known, and it has also been known to use a polymer of an α-olefin having 10 or more carbon atoms as a heat storage material.

For example, patent document 1 discloses that a crystalline higher α-olefin polymer obtained from a higher α-olefin having 10 or more carbon atoms is used for a heat storage material.

Patent document 2 discloses that a cross-linked olefin polymer obtained via a reaction of an α-olefin polymer obtained by polymerizing an α-olefin having 6 or more carbon atoms with another α-olefin, with a cross-linking agent is used for a heat storage material.

Patent document 3 discloses that a material obtained by decomposing an α-olefin polymer having an average number of carbon atoms of the α-olefins constituting the polymer of 6.0 to 14 in the presence of an organic peroxide is used for lubricating oil, ink, of the like.

PRIOR ART DOCUMENTS

Patent Documents

Patent Document 1: WO 2003/070790
Patent Document 2: JP-A-2006-131784
Patent Document 3: WO 2012/070240

SUMMARY OF THE INVENTION

Problems to be Solved by the Invention

However, in use of the polymers disclosed in the above-cited patent documents as a heat storage material, shape provision to molded articles made of the polymers is not yet satisfactory. For example, since the polymers have heat storage effects, the cooling cycle of their molded articles is long and, therefore, they are unsuitable for the production of cross-linked foam molded articles in which cooling in a short time is required.

Under such a situation, the challenge to be solved by the present invention is to provide a resin composition capable of easily affording a cross-linked foam excellent in heat storage performance, a cross-linked product (e.g., a cross-linked molded article or a cross-linked foam) of the resin composition, and a method for producing the cross-linked product.

Solutions to the Problems

The present invention relates to a resin composition (A) comprising a resin component (1) defined below and a resin component (2) defined below, wherein the content of the resin component (1) is 30% by weight to by weight and the content of the resin component (2) is 1% by weight to 70% by weight where the total amount of the resin component (1) and the resin component (2) is taken as 100% by weight, resin component (1): an olefin polymer comprising a main chain containing monomer units derived from ethylene and branch chains having 5 or more carbon atoms, the number of the branch chains being within the range of 20 chains to 40 chains per 1000 carbon atoms constituting the olefin polymer, and having a melting peak temperature measured with a differential scanning calorimeter (hereinafter referred to as DSC) of within the range of 10° C. to 50° C., a crystallization peak temperature measured with DSC of within the range of 0° C. to 40° C., and a melt enthalpy measured with DSC of 50 J/g or more, resin component (2): an olefin polymer having a melting peak temperature measured with DSC of within a range of 50° C. to 180° C.

Advantages of the Invention

According to the present invention, there can be provided a resin composition capable of easily affording a cross-linked foam excellent in heat storage performance, a cross-linked product of the resin composition, and a method for producing the cross-linked product.

MODE FOR CARRYING OUT THE INVENTION

<Resin Composition (A)>

The resin composition (A) is a resin composition comprising a resin component (1) and a resin component (2), wherein the content of the resin component (1) is 30% by weight to 99% by weight and the content of the resin component (2) is 1% by weight to 70% by weight where the total amount of the resin component (1) and the resin component (2) is taken as 100% by weight.

<Resin Component (1)>

The olefin polymer as the resin component (1) is a polymer having monomer units derived from ethylene in its main chain. The presence of monomer units derived from ethylene allows cross-linking induced by an electron beam or an organic peroxide to advance efficiently and can improve cross-linked nature.

The content of the monomer units derived from ethylene of the olefin polymer as the resin component (1) is preferably 50 mol % or more, more preferably 65 mol % or more, and even more preferably 50 mol % or more. The content of the monomer units derived from ethylene is preferably 95 mol % or less, and more preferably 90 mol % or less from the viewpoint of improving heat storage performance, where the total amount of the monomer units constituting the olefin polymer is taken as 100 mol %.

The olefin polymer as the resin component (1) has branch chains having 5 or more carbon atoms, the number of the branch chains being 20 chains to 40 chains per 1000 carbon atoms constituting the olefin polymer. From the viewpoint of improving heat storage performance, the number of the branch chains having 5 or more carbon atoms is preferably 23 chains or more, more preferably 25 chains or more, per 1000 carbon atoms constituting the olefin polymer. From the viewpoint of increasing gel fraction, the number of the branch chains having 5 or more carbon atoms is preferably 37 chains or less, more preferably 35 chains or less, per 1000 carbon atoms constituting the olefin polymer.

The number of the branch chains having 5 or more carbon atoms is obtained by measuring the area of a peak derived from methine carbon to which a branch chain having 5 or more carbon atoms is attached from a $^{13}$C-NMR spectrum measured by the carbon nuclear magnetic resonance ($^{13}$C-NMR) method, where the sum total of the areas of all peaks observed at 5 to 50 ppm is takers as 1000. The peak derived from methine carbon to which a branch chain having 5 or more carbon atoms is attached is observed at approximately 38.2 ppm (see Macromolecules, American Chemical Society, 1999, Vol. 32, pages 3817-3819). Since the position of the peak derived from methine carbon to which a branch chain having 5 or more carbon atoms is attached may shift depending on a measurement apparatus and measurement conditions, the position is usually determined by measuring an authentic sample for every measurement apparatus and measurement conditions. For spectral analysis, it is preferred to use a negative exponential function as a window function.

The olefin polymer as the resin composition (1) has a melting peak temperature observed with DSC of within the range of 10° C. to 50° C., a crystallization peak temperature observed with DSC of within the range of 0° C. to 40° C., and a melt enthalpy observed with DSC of 50 J/g or more. The melting peak temperature measured with DSC is the temperature corresponding to the summit (top) of the melting peak. Similarly, the crystallization peak temperature observed with DSC is the temperature corresponding to the summit (top) of the crystallization peak.

The melting peak temperature of the olefin polymer is preferably 15° C. or higher, more preferably 20° C. or higher, even more preferably 25° C. or higher, from the viewpoint of suppressing to absorb heat more than desired under an environment where a person feels cold. The melting peak temperature is preferably 40° C. or lower, more preferably 35° C. or lower, from the viewpoint of absorbing heat sufficiently under an environment where a person feels hot.

The crystallization peak temperature of the olefin polymer is preferably 10° C. or higher, more preferably 15° C. or higher, even more preferably 18° C. higher, from the viewpoint of generating heat sufficiently under an environment where a person feels cold. The crystallization peak temperature is preferably 37° C. or lower, more preferably 35° C. or lower, from the viewpoint of suppressing to generate heat more than desired under an environment where a person feels hot.

The melt enthalpy of the olefin polymer is preferably 60 J/g or more, more preferably 70 J/g or more, even more preferably 80 J/g or more, from the viewpoint of enhancing heat storage performance. Usually, the melt enthalpy of the olefin polymer is 200 J/g or less.

The aforementioned melting peak temperature, crystallization peak temperature, and melt enthalpy are values determined by the following methods.

Using a differential scanning calorimeter (for example, a differential scanning calorimeter DSC-7 manufactured by PerkinElmer), an aluminum pan containing about 10 mg of sample is subjected under a nitrogen atmosphere to (1) holding at 150° C. for 5 minutes, (2) lowering the temperature from 150° C. to 0° C. at a rate of 5° C./minute, (3) holding at 0° C. for 5 minutes, and (4) raising the temperature from 0° C. to 150° C. at a rate of 5° C./minute. The differential scanning calorimetry curve (namely, a DSC curve) obtained in the measurement of (2) is taken as a crystallization curve, and the DSC curve obtained in the measurement of (4) is taken as a melting curve. The crystallization peak temperature is a temperature at which the amount of heat generated is largest in a curve obtained by subtracting a blank line from the crystallization curve.

The melting peak temperature is a temperature at which the amount of heat absorbed is largest in a obtained by subtracting a blank line from the melting curve. The melt enthalpy is determined by converting integral of the curve obtained by subtracting the blank line from the melting curve into an amount of heat, and dividing the resulting amount of heat by the weight of the sample subjected to the measured. When the melting curve and the crystallization curve are broad and the blank line is not stable enough, the temperature range to measure may be broaden than the above-mentioned measurement temperature range of 0° C. to 150° C.

The intrinsic viscosity [η] of the olefin polymer as the resin component (1) is preferably within the range of 1.0 to 5.0. The intrinsic viscosity [η] of the olefin polymer is preferably 1.2 or more from the viewpoint of increasing a gel fraction. The intrinsic viscosity [η] olefin polymer is preferably 4.0 or less, more preferably 3.0 or less, from the viewpoint of suppressing the deterioration in moldability.

The [η] can be calculated using formula (I). The relative viscosity (ηrel) in formula (I) is determined from the drop times measured using an Ubbelohde viscometer of a sample solution prepared by dissolving 100 mg of an olefin polymer at 135° C. in 100 ml of tetralin containing 5% by weight of butylhydroxytoluene (BHT) as a heat deterioration inhibitor and a blank solution composed of only 100 ml of tetralin containing 0.5% by weight of BHT.

$$[\eta]=23.3\times\log(\eta rel) \quad (I)$$

The olefin polymer as the resin component (1) preferably has a weight average molecular weight Mw of 100,000 to 1,000,000 From the viewpoint of increasing gel fraction or suppressing the drop of mechanical strength, the weight average molecular weight Mw is preferably 150,000 or more, and more preferably 200,000 or more. From the viewpoint of suppressing the drop of moldability, the weight average molecular weight Mw is preferably 800,000 or less, and more preferably 600,000 or less.

The olefin polymer as the resin component (1) is a polymer having monomer units derived from ethylene and monomer units derived from an α-olefin having from 10 or more carbon atoms. The monomer units derived from an α-olefins having 10 or more carbon atoms are preferably those derived from an α-olefin having 14 or more carbon atoms, more preferably those derived from an α-olefin having 18 or more carbon atoms, from the viewpoint of suppressing to absorb heat more than desired under an environment where a person feels cold. The monomer units derived from an α-olefins having 10 or more carbon atoms are preferably those derived from an α-olefin having 30 or less carbon atoms, more preferably those derived from an α-olefin having 26 or less carbon atoms, from the viewpoint of absorbing heat sufficiently under an environment where a person feels hot.

Examples of the α-olefin having 10 or more carbon atoms include 1-decene, 1-dodecene, 1-tetradecene, 1-hexadecene, 1-octadecene, 1-eicosene, 1-docosene, 1-hexacosene, 1-octacosene, 1-triacontene, 1-dotriacontene, 1-tetratriacontene, 1-hexatriacontene, 1-octatriacontene, and 1-tetracontene. In the present invention, these α-olefins may be used individually or two or more of them may be used in combination.

If the olefin polymer as the resin component (1) has a structure in which monomer units derived from an α-olefin continue, the olefin polymer readily decomposes at sites having this structure. In order to suppress the formation of a structure in which monomer units derived from an α-olefin continue and also suppress the decomposition of an olefin polymer, it is preferred that the olefin polymer have monomer units derived from ethylene more than monomer units derived from the α-olefin.

For the olefin polymer as the resin component (1), monomers other than ethylene and the α-olefin having 10 or more carbon atoms may be used together. Examples of such other monomers include diolefin, cyclic olefins, alkenyl aromatic hydrocarbons, α,β-unsaturated carboxylic acids, metal salts of α,β-unsaturated carboxylic acids, alkyl esters of α,β-unsaturated carboxylic acids, unsaturated dicarboxylic acids, vinyl esters, and glycidyl esters of unsaturated carboxylic acids.

Examples of said diolefins include 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, norbornadiene, 5-methylene-2-norbornene, 1,5-cyclooctadiene, 5,8-endomethylenehexahydronaphthalene, 1,3-butadiene, isoprene, 1,3-hexadiene, 1,3-octadiene, 1,3-cyclooctadiene, and 1,3-cyclohexadiene.

Examples of said cyclic olefins include norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetyl norbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene, and 8-cyanotetracyclcdodecene.

Examples of said alkenyl aromatic hydrocarbons include alkenylbenzenes, such as styrene, 2-phenylpropylene, 2-phenylbutene, and 3-phenylpropylene, alkylstyrenes, such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene, and p-sec-butylstyrene, bisalkenylbenzenes, such as divinylbenzene, and alkenylnaphthalenes, such as 1-vinylnaphthalene.

Examples of said α,β-unsaturated carboxylic acids include acrylic acid, methacrylic acid, fumaric acid, maleic anhydride, itaconic acid, itaconic anhydride, and bicyclo(2, 2,1)-5-heptene-2,3-dicarboxylic acid.

Examples of said metal salts of α,β-unsaturated carboxylic acids include sodium salts, potassium salts, lithium salts, zinc salts, magnesium salts, and calcium salts of said α,β-unsaturated carboxylic acids.

Examples of said alkyl esters of unsaturated carboxylic acids include methyl acrylate, ethyl acrylate, n-propyl acrylate, isopropyl acrylate, tert-butyl acrylate, 2-ethylhexyl acrylate, methyl methacrylate, ethyl methacrylate, n-propyl methacrylate, isopropyl methacrylate, n-butyl methacrylate, and isobutyl methacrylate.

Examples of said unsaturated dicarboxylic acids include maleic acid and itaconic acid, and examples of said vinyl esters include vinyl acetate, vinyl propionate, vinyl caproate, vinyl caprylate, vinyl laurate, vinyl stearate, and vinyl trifluoroacetate.

Examples of said glycidyl esters of unsaturated carboxylic acids include glycidyl acrylate, glycidyl methacrylate, and monoglycidyl itaconate.

<Method for Producing Resin Component (1)>

The olefin polymer as the resin component (1) can be produced using a catalyst for polymerization acquired by, for example, contacting a transition metal compound (A) represented by formula (1) and a co-catalyst component (B).

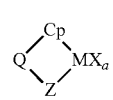

(1)

wherein M is a transition metal atom of Group 4 to 11 of the periodic table; Cp is a group having a cyclopentadiene type anion skeleton, and Z is a group having a cyclopentadiene type anion skeleton or a group containing a hetero atom; Q is a bridging group which connects Z with a cyclopentadienyl group; when Z is a group having a cyclopentadiene type anion skeleton, Cp and Z may be the same or may be different from each other;

X each independently represents:
a hydrogen atom,
a halogen atom,
an alkyl group having from 1 to 20 carbon atoms,
a cycloalkyl group having 3 to 10 carbon atoms constituting its ring,
an alkenyl group having 2 to 20 carbon atoms,
an aralkyl group having 7 to 30 carbon atoms,
an aryl group having 6 to 30 carbon atoms,
an alkoxy group having 1 to 20 carbon atoms,
an aralkyloxy group having 7 to 30 carbon atoms,
an aryloxy group having 6 to 30 carbon atoms,
a substituted silyl group,
a substituted amino group,
a substituted thiolate group, or
a carboxyiate group having 1 to 20 carbon atoms;
"a" is a number satisfying $1 \le a \le 3$.

M is a transition metal atom of Groups 4 to 11 of the periodic table, preferably is a transition metal atom of Group 4 of the periodic table, specifically, a titanium atom, a zirconium atom, or a hafnium atom, and particularly preferably is a titanium atom or a zirconium.

Examples of the group having a cyclopentadiene type anion skeleton in Cp or Z include a substituted or unsubstituted cyclopentadienyl group, a substituted or unsubstituted indenyl group, and a substituted or unsubstituted fluorenyl group. Specific examples include a cyclopentadienyl group, a methylcyclopentadienyl group, an ethylcyclopentadienyl group, a n-butylcyclopentadienyl group, a tert-butylcyclopentadienyl group, a dimethylcyclcpentadienyl group, an ethyl(methyl)cyclopentadienyl group, a tert-butyl (methyl)cyclopentadienyl group, an isopropyl(methyl)cyclopentadienyl group, a methyl(n-butyl)cyclopentadienyl group, a trimethylcyclopentadienyl group, a tetramethylcyclopentadienyl group, an indenyl group, a 4,5,6,7-tetrahydroindenyl group, a 2-methylindenyl group, a 3-methylindenyl group, a 4-methylindenyl group, a 5-methylindenyl group, a 6-methylindenyl group, a 7-methylindenyl group, a 2-tert-butylindenyl group, a 3-tert-butylindenyl group, a 4-tert-butylindenyl group, a 5-tert-butylindenyl group, a 6-tert-butylindenyl group, a 7-tert-butylindenyl group, a 2,3-dimethylindenyl group, a 4,7-dimethylindenyl group, a 2,4,7-trimethylindenyl group, a 2-methyl-4-isopropylindenyl group, a 4,5-benzindenyl group, a 2-methyl-4,5-benzindenyl group, a 4-phenylindenyl group, a 2-methyl-5-phenylindenyl group, a 2-methyl-4-phenylindenyl group, a 2-methyl-4-naphthylindenyl group, a fluorenyl group, a 2,7-dimethylfluorenyl group, and a 2,7-di-tert-butylfluorenyl group.

While the number, expressed by η, of atoms on which the group having a cyclopentadiene type anion skeleton in Cp or Z coordinates to M may be any number which the group having a cyclopentadiene type anion skeleton can take, it is preferably 5, 3 or 1, and more preferably is 5 or 3.

Z may be a group containing a hereto atom and represents, for example, —O—, —S—, —NR$^i$—, —PR$^i$—, or a group represented by any of the following formulae (i) to (iv). Of the atoms included in Z, the atom to form a bond with M is an oxygen atom, a sulfur atom, a nitrogen atom, or a phosphorus atom.

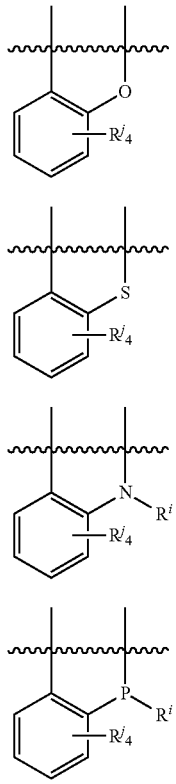

$R^i$ and $R^j$ each independently represent
a hydrogen atom,
a halogen atom,
an alkyl group having from 1 to 20 carbon atoms,
a cycloalkyl group having 3 to 10 carbon atoms constituting its ring,
an alkenyl group having 2 to 20 carbon atoms,
an alkynyl group having 2 to 20 carbon atoms,
an aralkyl group having 7 to 30 carbon atoms,
an aryl group having 6 to 30 carbon atoms,
an alkoxy group having 1 to 20 carbon atoms,
an aralkyloxy group having 7 to 30 carbon atoms,
an aryloxy group having 6 to 30 carbon atoms,
a substituted silyl group, or
a heterocyclic compound residue having 3 to 20 carbon atoms.

The alkyl group, the cycloalkyl group, the alkenyl group, the alkynyl group, the aralkyl group, the aryl group, the alkoxy group, the aralkyloxy group, the aryloxy group, and the heterocyclic compound residue as $R^i$ and $R^j$ each may have a substituent.

Preferred as $R^i$ is a hydrogen atom, a halogen atom, an alkyl group having 1 to 20 carbon atoms, an aralkyl group having 7 to 30 carbon atoms, an aryl group having 6 to 30 carbon atoms, or a substituted silyl group.

Preferred as $R^j$ is a hydrogen atom, a halogen atom, an alkyl group having 1 to 20 carbon atoms, an aralkyl group having 7 to 30 carbon atoms, an aryl group having 6 to 30 carbon atoms, an alkoxy group having 1 to 20 carbon atoms, an aralkyloxy group having 7 to 30 carbon atoms, an aryloxy group having 6 to 30 carbon atoms, or a substituted silyl group. Two adjoining Rj may be linked to each other and form a ring.

Preferred as a group containing a hetero atom in Z is —NR$^i$— and a group represented by the above formula (i).

Q is a group that bridges Cp and Z, and examples thereof include alkylene groups, such as a methylene group, an ethylene group, and a propylene group; substituted alkylene groups, such as a dimethylmethylene group (isopropylidene group) and a diphenylmethylene group; substituted silylene groups, such as a silylene group, a dimethylsilylene group, a diethylsilylene group, a diphenylsilylene group, a tetramethyldisilylene group, and a dimethoxysilylene group; and hetero atoms, such as a nitrogen atom, an oxygen atom, a sulfur atom, and a phosphorus atom. Preferred is a methylene group, an ethylene group, a dimethylmethylene group (isopropylidene group), a diphenylmethylene group, a dimethylsilylene group, a diethylsilylene group, a diphenylsilylene group, or a dimethoxysilylene group.

Examples of the halogen atom as X include a fluorine atom, a chlorine atom, a bromine atom, and an iodine atom.

Examples of the alkyl group having 1 to 20 carbon atoms as X include methyl group, ethyl group, n-propyl group, isopropyl group, n-butyl group, sec-butyl group, tert-butyl group, isobutyl group, n-pentyl group, neopentyl group, amyl group, n-hexyl group, n-octyl group, n-decyl group, n-dodecyl group, n-pentadecyl group, and n-eicosyl group, and preferred among these is a methyl group, an ethyl group, an isopropyl group, a tert-butyl group, an isobutyl group, or an amyl group. Each of these alkyl groups may have a halogen atom, such as a fluorine atom, a chlorine atom, a bromine atom, and an iodine atom, as a substituent. Examples of the alkylene group having a halogen atom as a substituent include a fluoromethyl group, a trifluoromethyl group, a chloromethyl group, a trichloromethyl group, a fluoroethyl group, a pentafluoromethyl group, a perfluoropropyl group, a perfluorobutyl group, a perfluorohexyl group, a perfluorooctyl group, a perchloropropyl group, a perchlorobutyl group, and a perbromopropyl group. These alkyl groups may have an alkoxy group, such as a methoxy group and an ethoxy group, an aryloxy group, such as a phenoxy group, an aralkyloxy group, such as a benzyloxy group, or the like as a substituent.

Examples of the alkenyl group having 2 to 20 carbon atoms as X include an allyl group, a methallyl group, a crotyl group, a 1,3-diphenyl-2-propenyl group, and preferred among these is an allyl group or a methallyl group.

Examples of the aralkyl group having 7 to 30 carbon atoms as X include a benzyl group, a (2-methylphenyl) methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphentyl)methyl group, a (isopropylphenyl)methyl group, a (n-butylphenyl)methyl group, a (see-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl)methyl group, a naphthylmethyl group, and an anthracenylmethyl group, and more preferred is a benzyl group. These aralkyl groups may have a halogen atom, such as a fluorine atom, a chlorine atom, a bromine atom, and an iodine atom, an alkoxy group, such as a methoxy group and an ethoxy group, an aryloxy group, such as a phenoxy group, an aralkyloxy group, such as a benzyloxy group, or the like as a substituent.

Examples of the aryl group having 6 to 30 carbon atoms as X include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl, group, a n-decylphenyl group, a n-dodecylphenyl group, a n-tetradecylphenyl group, a naphthyl group, and an anthracenyl group, and preferred is a phenyl group. These aryl groups may have a halogen atom, such as a fluorine atom, a chlorine atom, a bromine atom, and an iodine atom, an alkoxy group, such as a methoxy group and an ethoxy group, an aryloxy group, such as a phenoxy group, an aralkyloxy group, such as a benzyloxy group, or the like as a substituent.

Examples of the alkenyl group having 2 to 20 carbon atoms as X include an allyl group, a methallyl group, a crotyl group, a 1,3-diphenyl-2-propenyl group, and preferred among these is an allyl group or a methallyl group.

Examples of the alkoxy group having 1 to 20 carbon atoms as X include a methoxy group, an ethoxy group, a n-propoxy group, an isopropoxy group, a n-butoxy, a sec-butoxy group, a tert-butoxy group, a n-pentoxy group, a neopentoxy group, a n-hexoxy group, a n-octoxy group, a n-dodecoxy group, a n-pentadecoxy group, and a n-eicosoxy group, and preferred among these is a methoxy group, an ethoxy group, an isopropoxy group, or a tert-butoxy group. These alkoxy groups may have a halogen atom, such as a fluorine atom, a chlorine atom, a bromine atom, and an iodine atom, an alkoxy group, such as a methoxy group and an ethoxy group, an aryloxy group, such as a phenoxy group, an aralkyloxy group, such as a benzyloxy group, or the like as a substituent.

Examples of the aralkyloxy group having 7 to 30 carbon atoms as X include a benzyloxy group, a (2-methylphenyl) methoxy group, a (3-methylphenyl)methoxy group, a (4-methylphenyl) methoxy group, a (2,3-dimethylphenyl) methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl) methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl), a (tert-butylphenyl) methoxy group, a (n-hexylphenyl)methoxy group, a (n-octylphenyl)methoxy group, a (n-decylphenyl) methoxy group, a naphthylmethoxy group, and an anthracenylmethoxy group, and preferred among these is a benzyloxy group.

These aralkyloxy groups may have a halogen atom, such as a fluorine atom, a chlorine atom, a bromine atom, and an iodine atom, an alkoxy group, such as a methoxy group and an ethoxy group, an aryloxy group, such as a phenoxy group, an aralkyloxy group, such as a benzyloxy group, or the like as a substituent.

Examples of the aryloxy group having 6 to 30 carbon atoms as X include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,5-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group, and an anthracenoxy group. These aryloxy may have a halogen atom, such as a fluorine atom, a chlorine atom, a bromine atom, and an iodine atom, an alkoxy group, such as a methoxy group and an ethoxy group, an aryloxy group, such as a phenoxy group, an aralkyloxy group, such as a benzyloxy group, or the like as a substituent.

Examples of the substituted silyl group as X include a trimethylsilyl group, a triethylsilyl group, a tri-n-propylsilyl group, a triisopropylsilyl group, a tri-n-butylsilyl group, a triisobutylsilyl group, a tert-butyldimethylsilyl group, a methyldiphenylsilyl group, a dimethyl(phenyl) silyl group, a tert-butylphenylsilyl group, a triphenylsilyl group, a methylbis(trimethylsilyl)silyl group, a dimethyl(trimethylsilyl)silyl group, and a tris(trimethylsilyl)silyl group, and preferably include trialkylsilyl groups having from 3 to 20 carbon atoms, such as a trimethylsilyl group, a triethylsilyl group, a tri-n-propylsilyl group, a triisopropylsilyl group, and a tert-butyldimethylsilyl group; and silyl groups having a hydrocarbylsilyl group having 3 to 20 carbon atoms as a substituent, such as a methylbis(trimethylsilyl)silyl group, a dimethyl(trimethylsilyl)silyl group, and a tris(trimethylsilyl)silyl group.

The substituted amino group as X may be, for example, a hydrocarbylamino group having 2 to 14 carbon atoms, such as a dimethylamino group, a diethylamino group, a di-n-butylamino group, a di-n-propylamino group, a diisopropylamino group, a dibenzylamino group, or a diphenylamino group, and it is preferably a dimethylamino group, a diethylamino group, a di-n-propylamino group, a diisopropylamino group, or a dibenaylamino group.

The substituted thiolate group as X may be a hydrocarbylthiolate group having 6 to 12 carbon atoms, such as a thiophenoxy group, a 2,3,4-trimethylthiophenoxy group, a 2,3,5-trimethylthiophenoxy group, a 2,3,6-trimethylthiophenoxy group, a 2,4,6-trimethylthiophenoxy group, a 3,4,5-trimethylthiophenoxy group, a 2,3,4,5-tetramethylthiophenoxy group, a 2,3,4,6-tetra-methylthiophenoxy group, a 2,3,5,6-tetramethylphenoxy group, a pentamethylphenoxy group, a 2-fluorothiophenoxy group, a 3-fluorothiophenoxy group, a 4-fluorophenoxy group, a pentfluorothiophenoxy group, a 2-trifluoromethylthiophenoxy group, a 3-trifluoromethylthiophenoxy group, a 4-trifluoromethylthiophenoxy group, a 2,3-difluorothiophenoxy group, a 2,4-fluorothiophenoxy group, a 2,5-difluorothiophenoxy group, a 2-chlorothiophenoxy group, a 2,3-dichlorothiophenoxy group, a 2,4-dichlorothiophenoxy group, a 2,5-dichlorothiophenoxy group, a 2-bromothiophenoxy group, a 3-bromothiophenoxy group, a 4-bromothiophenoxy group, a 2,3-dibromothiophenoxy group, a 2,4-dibromothiophenoxy group, or a 2,5-dibromothiophenoxy group, and it is preferably a thiophenoxy group, a 2,4,6-trimethylthiophenoxy group, a 3,4,5-trimethylthiophenoxy group, a 2,3,4,5-tetramethylthiophenoxy group, a 2,3,4,6-tetramethylthiophenoxy group, a 2,3,5,6-tetramethylthiophenoxy group, a pentamethylthiophenoxy group, or a pentafluorothiophenoxy group.

The carboxylate group having 1 to 20 carbon atoms as X may be an acetate group, a propionate group, a butylate group, a pentanate group, a hexanoate group, a 2-ethylhexanoate group, or a trifluoroacetate group, it is more preferably a hydrocarbylcarboxylate group having 2 to 10 carbon atoms, and it is more preferably an acetate group, a propionate group, a 2-ethylhexanoate group, or a trifluoroacetate group.

Preferred as X is a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenylphenoxy group, or a benzyl group.

"a" in formula (1) is a number satisfying $1 \leq a \leq 3$ and is chosen appropriately according to the valence of M. When M is a titanium atom, a zirconium atom, or a hafnium atom, it is preferred that "a" be 2.

Examples of the compound represented by formula (1) wherein the transition metal atom is a titanium atom include: dimethylsilylenebis(cyclopentadienyl)titanium dichloride, dimethylsilylenebis(2-methylcyclopentadienyl)titanium dichloride, dimethylsilylenebis(3-methylcyclopentadienyl)titanium dichloride, dimethylsilylenebis(2-n-butylcyclopentadienyl)titanium dichloride, dimethylsilylenebis(3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis(3,4-dimethylcyclopentadienyl)titanium dichloride, dimethylsilylenebis(2,3-ethylmethylcyclopentadienyl)titanium dichloride, dimethylsilylenebis(2,4-ethylmethylcyclopentadienyl)titanium dichloride, dimethylsilylenebis(2,5-ethylmethylcyclopentadienyl)titanium dichloride, dimethylsilylenebis(3,5-ethylmethylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl)titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl)titanium dichloride, dimethylsilylenebis(2,4,7-trimethylindenyl)titanium dichloride, dimethylsilylenebis(2-methyl-4-isopropylindenyl)titanium dichloride, dimethylsilylenebis(4,5-benzindenyl)titanium dichloride, dimethylsilylenebis(2-methyl-4,5-benzindenyl)titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride, dimethylsilylenebis(2-methyl-5-phenylindenyl)titanium dichloride, dimethylsilylenebis(2-methyl-4-naphthylindenyl)titanium dichloride, dimethylsilylenebis(4,5,6,7-tetrahydroindenyl)titanium dichloride, dimethylsilylene(cyclopentadienyl)(indenyl)titanium dichloride, dimethylsilylene(methylcyclopentadienyl)(indenyl)titanium dichloride, dimethylsilylene(n-butylcyclopentadienyl)(indenyl)titanium dichloride, dimethylsilylene(tetramethylcyclopentadienyl)(indenyl)titanium dichloride, dimethylsilylene(cyclopentadienyl)(fluorenyl)titanium dichloride, dimethylsilylene(methylcyclopentadienyl)(fluorenyl)titanium dichloride, dimethylsilylene(n-butylcyclopentadienyl)(fluorenyl)titanium dichloride, dimethylsilylene(tetramethylcyclopentadienyl)(indenyl)titanium dichloride, dimethylsilylene(indenyl)(fluorenyl)titanium dichloride, dimethylsilylenebis(fluorenyl)titanium dichloride, dimethylsilylene(cyclopentadienyl)(tetramethylcyclopentadienyl)titanium dichloride, dimethylsilylene(tetramethylcyclopentadienyl)(fluorenyl)titanium dichloride, dimethylsilylene(cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)

titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy)titanium dichloride, dimethylsilylene(cyclopentadienyl)(3-phenyl-2-phenoxy)titanium dichloride, dimethylsilylene(cyclopentadienyl)(1-naphthox-2-yl)titanium dichloride, dimethylsilylene(methylcyclopentadienyl)(2-phenoxy)titanium dichloride, dimethylsilylene(methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl 2-phenoxy)titanium dichloride, dimethylsilylene(methylcyclopentadienyl)(3,5-di-tert-butyl-2-phenoxy)titanium dichloride, dimethylsilylene(methylcyclopentadienyl)(5-methyl-3-phenyl-2-phenoxy)titanium dichloride, dimethylsilylene(methylcyclopentadienyl)(3-tert-butyldimethylsilyl-5-methyl-2-phenoxy)titanium dichloride, dimethylsilylene(methylcyclopentadienyl)(5-methyl-3-trimethylsilyl-2-phenoxy)titanium dichloride, dimethylsilylene(methylcyclopentadienyl)(3-tert-butyl-5-methoxy 2-phenoxy)titanium dichloride, dimethylsilylene(methylcyclopentadienyl)(3-tert-butyl-5-chloro-2-phenoxy)titanium dichloride, dimethylsilylene(methylcyclopentadienyl)(3,5-diamyl-2-phenoxy)titanium dichloride, dimethylsilylene(methylcyclopentadienyl)(3-phenyl-2-phenoxy)titanium dichloride, dimethylsilylene(methylcyclopentadienyl)(1-naphthox-2-yl)titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy)titanium dichloride, dimethylsilylene(n-butylcyclopentadienyl)(3-tert-butyl-5-chloro-2-phenoxy)titanium dichloride, dimethylsilylene(n-butylcyclopentadienyl)(3,5-diamyl-2-phenoxy)titanium dichloride, dimethylsilylene(n-butylcyclopentadienyl)(3-phenyl-2-phenoxy)titanium dichloride, dimethylsilylene(n-butylcyclopentadienyl)(1-naphthox-2-yl)titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy)titanium dichloride, dimethylsilylene(tert-butylcyclopentadienyl)(5-methyl-3-phenyl-2-phenoxy)titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl 2-phenoxy)titanium dichloride, dimethylsilylene(tert-butylcyclopentadienyl)(3-tert-butyl-5-methoxy-2-phenoxy)titanium dichloride, dimethylsilylene(tert-butylcyclopentadienyl)(3-tert-butyl-5-chloro-2-phenoxy)titanium dichloride, dimethylsilylene(tert-butylcyclopentadienyl)(3,5-diamyl-2-phenoxy)titanium dichloride, dimethylsilylene(tert-butylcyclopentadienyl)(3-phenyl-2-phenoxy)titanium dichloride, dimethylsilylene(tert-butylcyclopentadienyl)(1-naphthox-2-yl)titanium dichloride, dimethylsilylene(tetramethylcyclopentadienyl)(2-phenoxy)titanium dichloride, dimethylsilylene(tetramethylcyclopentadienyl)(3-methyl-2-phenoxy)titanium dichloride, dimethylsilylene(tetramethylcyclopentadienyl)(3,5-dimethyl-2-phenoxy)titanium dichloride, dimethylsilylene(tetramethylcyclopentadienyl)(3-tert-butyl-2-phenoxy)titanium dichloride, dimethylsilylene(tetramethylcyclopentadienyl)(3-tert-butyl-5-methyl-2-phenoxy)titanium dichloride, dimethylsilylene(tetramethylcyclopentadienyl)(3,5-di-tert-butyl-2-phenoxy)titanium dichloride, dimethylsilylene(tetramethylcyclopentadienyl)(5-methyl-3-phenyl-2-phenoxy)titanium dichloride, dimethylsilylene(tetramethylcyclopentadienyl)(3-tert-butyldimethylsilyl-5-methyl-2-phenoxy)titanium dichloride, dimethylsilylene(tetramethylcyclopentadienyl)(5-methyl-3-trimethylsilyl-2-phenoxy)titanium dichloride, dimethylsilylene(tetramethylcyclopentadienyl)(3-tert-butyl-5-methoxy-2-phenoxy)titanium dichloride, dimethylsilylene(tetramethylcyclopentadienyl)(3-tert-butyl-5-chloro-2-phenoxy)titanium dichloride, dimethylsilylene(tetramethylcyclopentadienyl)(3,5-diamyl-2-phenoxy)titanium dichloride, dimethylsilylene(tetramethylcyclopentadienyl)(3-phenyl 2-phenoxy)titanium dichloride, dimethylsilylene(tetramethylcyclopentadienyl)(1-naphthox-2-yl)titanium dichloride, dimethylsilylene(trimethylsilylcyclopentadienyl)(2-phenoxy)titanium dichloride, dimethylsilylene(trimethylsilylcyclopentadienyl)(3-methyl-2-phenoxy)titanium dichloride, dimethylsilylene(trimethylsilylcyclopentadienyl)(3,5-dimethyl-2-phenoxy)titanium dichloride, dimethylsilylene(trimethylsilylcyclopentadienyl)(3-tert-butyl-2-phenoxy)titanium dichloride, dimethylsilylene(trimethylsilylcyclopentadienyl)(3-tert-butyl-5-methyl 2-phenoxy)titanium dichloride, dimethylsilylene(trimethylsilylcyclopentadienyl)(3,5-di-tert-butyl-2-phenoxy)titanium dichloride, dimethylsilylene(trimethylsilylcyclopentadienyl)(5-methyl 3-phenyl-2-phenoxy)titanium dichloride, dimethylsilylene(trimethylsilylcyclopentadienyl)(3-tert-butyldimethylsilyl-5-methyl-2-phenoxy)titanium dichloride, dimethylsilylene(trimethylsilylcyclopentadienyl)(5-methyl-3-trimethylsilyl-2-phenoxy)titanium dichloride, dimethylsilylene(trimethylsilylcyclopentadienyl)(3-tert-butyl-5-methoxy-2-phenoxy)titanium dichloride, dimethylsilylene(trimethylsilylcyclopentadienyl)(3-tert-butyl-5-chloro-2-phenoxy)titanium dichloride, dimethylsilylene(trimethylsilylcyclopentadienyl)(3,5-diamyl-2-phenoxy)titanium dichloride, dimethylsilylene(trimethylsilylcyclopentadienyl)(3-phenyl 2-phenoxy)titanium dichloride, dimethylsilylene(trimethylsilylcyclopentadienyl)(1-naphthox-2-yl)titanium dichloride, dimethylsilylene(indenyl)(2-phenoxy)titanium dichloride, dimethylsilylene(indenyl)(3-methyl-2-phenoxy)titanium dichloride, dimethylsilylene(indenyl)(3,5-dimethyl-2- phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl)(3,5-di-tert-butyl-2-phenoxy)titanium dichloride, dimethylsilylene(indenyl)(5-methyl-3-phenyl-2-phenoxy)titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl 5-methoxy-2-phenoxy)titanium dichloride, dimethylsilylene(indenyl)(3-tert-butyl-5-chloro-2-phenoxy)titanium dichloride, dimethylsilylene(indenyl)(3,5-diamyl-2-phenoxy)titanium dichloride, dimethylsilylene(indenyl)(3-phenyl-2-phenoxy)titanium dichloride, dimethylsilylene(indenyl)(1-naphthox-2-yl)titanium dichloride, dimethylsilylene(fluorenyl)(2-phenoxy)titanium dichloride, dimethylsilylene(fluorenyl)(3-methyl-2-phenoxy)titanium dichloride, dimethylsilylene(fluorenyl)(3,5-dimethyl-2-phenoxy)titanium dichloride, dimethylsilylene(fluorenyl)(3-tert-butyl-2-phenoxy)titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy)titanium dichloride, dimethylsilylene(fluorenyl)(5-methyl-3-phenyl-2-phenoxy)titanium dichloride, dimethylsilylene(fluorenyl)(3-tert-butyldimethylsilyl-5-methyl-2-phenoxy)titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-diamyl-2-phenoxy)titanium dichloride, dimethylsilylene(fluorenyl)(3-phenyl-2-phenoxy)titanium dichloride, dimethylsilylene(fluorenyl)(1-naphthox-2-yl)titanium dichloride, (tert-butylamido)tetramethylcyclopentadienyl-1,2-ethanediyl titanium dichloride, (methylamido)tetramethylcyclopentadienyl-1,2-ethanediyltitanium dichloride, (ethylamido)tetramethylcyclopentadienyl-1,2-ethanediyltitanium dichloride, (tert-butylamido)tetramethylcyclopentadienyldimethylsilanetitanium dichloride, (benzylamido)tetramethylcyclopentadienyldimefchyisilanetitanium dichloride, (phenylphosphido)tetramethylcyclopentadienyldimethylsilanetitanium dichloride, (tert-butylamido)indenyl-1,2-ethanediyl titanium dichloride, (tert-butylamido)tetrahydroindenyl-1,2-ethanediyltitanium dichloride, (tert-butylamido)fluorenyl-1,2-ethanediyltitanium dichloride, (tert-butylamido)indenyldimethylsilanetitanium dichloride, (tert-butylamido)tetrahydroindenyldimethylsilanetitanium dichloride, and (tert-butylamido)fluorenyldimethylsilanetitanium dichloride, Moreover, compounds named by replacing "titanium" in the preceding compound names by "zirconium" or "hafnium", compounds named by replacing "(2-phenoxy)" by "(3-phenyl-2-phenoxy)", "(3-trimethylsilyl-2-phenoxy)" or "(3-tert-butyldimethylsilyl-2-phenoxy)", compounds named by replacing "dimethylsilylene" by "methylene", "ethylene", "dimethylmethylene (isopropylidene)", "diphenylmethylene", "diethylsilylene", "diphenylsilylene", or "dimethoxysilylene", and compounds named by replacing "dichloride" by "difluoride", "dibromide", "diiodide", "dimethyl", "diethyl", "diisopropyl", "diphenyl", "dibenzyl", "dimethoxide", "diethoxide", "di(n-propoxide)", "di(isopropoxide)", "diphenoxide", or "di(pentafluorophenoxide)" also can be enumerated as examples of the transition metal compound represented by formula (1).

Compounds represented by formula (1) may be used individually or two or more of them may be used in combination as the transition metal compound (A).

The transition metal compound represented by formula (1) can be produced by the production methods disclosed in JP-A-9-87313, JP-A-6-340684, JP-A-7-258321, WO 95/00562, etc.

The cocatalyst component (B) is not particularly restricted as long as it is one capable of activating the transition metal compound (A) to make it polymerizable, and that may be at least one compound selected from the group consisting of an organoaluminum compound (B-1) and an organoboron compound (B-2).

The organoaluminum compound (B-1) may be a publicly known compound and preferably is a compound represented by any one of the following formulae (1) to (3) or a mixture thereof:

(1) a compound represented by $E_b^1 AlY_{3-b}^1$ (hereafter sometimes expressed by organoaluminum compound (B-1-1)), (2) a cyclic aluminoxane represented by $(-Al(E^2)-O-)_c$ (hereafter sometimes expressed by organoaluminum compound (B-1-2)), (3) a linear aluminoxane represented by $E^3(-Al(E^3)-O-)_d AlE_2^3$ (hereafter sometimes expressed by organoaluminum compound (B-1-3)), Wherein $E^1$, $E^2$, and $E^3$ are hydrocarbyl groups having 1 to 8 carbon atoms; all $E^1$, all $E^3$ and all $E^3$ are the same or different; $Y^1$ represents a hydrogen atom or a halogen atom, all $Y^1$ are the same or different; b represents a number of $0<b\leq3$, c represents an integer greater than or equal to 2, and d represents an integer of 1 or more.

Examples of the organoaluminum compound (B-1-1) include trialkylaluminums such as trimethylaluminum, triethylaluminum, tripropylaluminum, triisobutylaluminum, and trihexylaluminum; dialkylaluminum chlorides such as dimethylaluminum chloride, diethylaluminum chloride, dipropylaluminum chloride, diisobutylaluminum chloride, and dihexylaluminum chloride; alkylaluminum dichlorides such as methylaluminum dichloride, ethylaluminum dichloride, propylaluminum dichloride, isobutylaluminum dichloride, and hexylaluminum dichloride; and dialkylaluminum hydrides such as dimethylaluminum hydride, diethylaluminum hydride, dipropylaluminum hydride, diisobutylaluminum hydride, and dihexylaluminum hydride. Especially, trialkylaluminums are preferred, and triethylaluminum or triisobutylaluminum is more preferred.

Examples of $E^2$ and $E^3$ in the formulae provided above include alkyl groups such as a methyl group, an ethyl group, a normal propyl group, an isopropyl group, a normal butyl group, an isobutyl group, a normal pentyl group, and a neopentyl group. Especially, a methyl group or an isobutyl group is preferred. c is an integer of 2 or more, preferably an integer of 2 to 40; d is an integer of 1 or more, preferably an integer of 1 to 40.

The method for producing the above-described aluminoxane is not particularly limited and may be a publicly known method. Examples of such production methods include a method in which a solution prepared by dissolving a trialkylaluminum (e.g., trimethylaluminum) in a proper organic solvent (e.g., benzene or an aliphatic hydrocarbyl) is brought into contact, with water, and a method in which a trialkyaluminum (e.g., trimethylaluminum) is brought into contact with a metal salt containing water of crystallization (e.g., copper sulfate hydrate).

Examples of the above-mentioned boron compound (B-2) include the following compounds:

(1) a boron compound represented by the formula $BR^{13}R^{14}R^{15}$ (hereafter sometimes expressed by boron compound (B-2-1)), (2) a boron compound represented by the formula $M^{2+}(BR^{13}R^{14}R^{15}R^{16})^-$ (hereafter sometimes expressed by boron compound (B-2-2)), (3) a boron compound represented by the formula $(M^3\text{-H})^+(BR^{13}R^{14}R^{15}R^{16})^-$ (hereafter sometimes expressed by boron compound (B-2-3)), wherein $R^{13}$ to $R^{16}$ are each a halogen atom, a hydrocarbyl group containing 1 to 20 carbon atoms, a halogenated hydrocarbyl group containing 1 to 20 carbon atoms, a substituted silyl group containing 1 to 20 carbon atoms, an alkoxy group containing 1 to 20 carbon atoms, or a disubstituted amino group containing 2 to 20 carbon atoms, they may be the same or different, and they are each preferably a halogen atom, a hydrocarbyl group containing 1 to 20 carbon atoms, or a halogenated hydrocarbyl group containing 1 to 20 carbon atoms; $M^{2+}$ is an inorganic or organic cation; $M^3$ is a neutral Lewis base; and $(M^3\text{-H})^+$ is a Brønsted acid.

Examples of the compound (B-2-1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, and phenylbis(pentafluorophenyl)borane. Especially, tris(pentafluorophenyl)borane is most preferred.

Examples of the $M^{2+}$ in the compound (B-2-2) include a ferrocenium cation, an alkyl-substituted ferrocenium cation, a silver cation, and a triphenylmethyl cation. Examples of the $(BR^{13}R^{14}R^{15}R^{16})^-$ the compound (B-2-2) include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,2,4-trifluorophenyl)borate, phenylbis(pentafluorophenyl)borate, and tetrakis(3,5-bistrifluoromethylphenyl)borate. Examples of the compound (B-2-2) include ferrocenium tetrakis(pentafluorophenyl)borate, 1,1'-dimethylferrocenium tetrakis (pentafluorophenyl)borate, silver tetrakis(pentafluorophenyl)borate, triphenylmethyl tetrakis(pentafluorophenyl) borate, and triphenylmethyl tetrakis(3,5-bistrifluoromethylphenyl)borate. Especially, the most preferred is triphenylmethyl tetrakis(pentafluorophenyl)borate.

Examples of the $(M^3\text{-H})^+$ of the compound (B-2-3) include trialkyl-substituted ammonium, N,N-dialkylanilinium, dialkylammonium, and triarylphosphonium, and examples of the $(BR^{13}R^{14}R^{15}R^{16})^-$ may include those enumerated above. Examples of the compound (B-2-3) include triethylammonium tetrakis(pentafluorophenyl)borate, tripropylammonium tetrakis(pentafluorophenyl)borate, tri (n-butyl)ammonium tetrakis(pentafluorophenyl)borate, tri (n-butyl)ammonium tetrakis(3,5-bis-trifluoromethylphenyl) borate, N,N-dimethylanilinium tetrakis(pentafluorophenyl) borate, N,N-diethylanilinium tetrakis(pentafluorophenyl) borate, N,N-2,4,6-pentamethylanilinium tetrakis (pentafluorophenyl)borate, N,N-dimethylanilinium tetrakis (3,5-bis-trifluoromethylphenyl)borate, diisopropylammonium tetrakis(pentafluorophenyl)borate, dicyclohexylammonium tetrakis(pentafluorophenyl)borate, triphenyl phosphonium tetrakis(pentafluorophenyl)borate, tri(methylphenyl)phosphonium tetrakis(pentafluorophenyl) borate, and tri(dimethylphenyl)phosphonium tetrakis(pentafluorophenyl)borate. Especially, the most preferred is tri(n-butyl)ammonium tetrakis(pentafluorophenyl)borate or N,N-dimethylanilinium tetrakis(pentafluorophenyl)borate.

Preferred as the cocatalyst component (B) are the above-described organoaluminum compound (B-1-2) and/or the above-described organoaluminum compound (B-1-3), or a combination of an organoaluminum compound (B-1-1) and a boron compound (B-2).

When applying the above-mentioned catalyst for polymerization to polymerization accompanied by the formation of polymer particles such as gas phase polymerization and bulk polymerization, modified particles obtained by bringing aluminoxane (a) into contact with particles (b) are preferably used as the above-described cocatalyst component.

Preferred as the aluminoxane (a) are the above-described organoaluminum compounds (B-1-2) and (B-1-3).

Preferable examples of other modified particles include the modified particles disclosed in JP-A-2003-171412, JP-A-2003-171413, JP-A-2005-126627, JP-A-2005-126628, JP-A-2007-269997, JP-A-2012-31154, and JP-A-2012-31397.

The contact treatment of the transition metal complex (A) and with the cocatalyst component (B) may be performed by any means as long as the transition metal complex (A) and the cocatalyst component (B) come into contact with each other and a catalyst is formed; there can be taken a method in which the respective components are or are not diluted with a solvent beforehand and the transition metal complex (A) and the cocatalyst component (B) are mixed and brought into contact with each other, or a method in which the transition metal complex (A) and the cocatalyst component (B) are fed separately to a polymerization vessel and these are brought into contact with each other within the polymerization vessel. While a plurality of cocatalyst components may be used in combination as the cocatalyst component (B), they may be used with some of them having been mixed in advance or may be used by being fed separately to a polymerization vessel.

When the organoaluminum compound (B-1) is used as the cocatalyst component (B), the molar ratio of the (B-1) to the transition metal compound (A) is 0.01 to 10000, preferably 1 to 5000. When the boron compound (B-2) is used as the cocatalyst component (3), the molar ratio of the (B-2) to the transition metal compound (A) is 0.01 to 100, preferably 1.0 to 50.

In the case of producing a catalyst in a polymerization reaction vessel before polymerization reaction, the concentration used when the respective components are fed in a solution state or in a state where they are suspended or slurried in a solvent is determined appropriately depending on conditions including the performance of the apparatus that feeds the respective components to the polymerization reaction vessel.

Generally, the concentration of the transition metal compound (A) is usually 0.00001 to 100 mol/L, preferably 0.0001 to 10 mol/L, more preferably 0.0001 to 5 mol/L. The concentration of the organoaluminum compound (B-1) in terms of Al atoms is usually 0.01 to 10000 mol/L, preferably 0.05 to 5000 mol/L, more preferably 0.1 to 2000 mol/L. The concentration of the boron compound (B-2) is usually 0.00001 to 500 mol/L, preferably 0.0001 to 250 mol/L, more preferably 0.01 to 100 mol/L.

In the event that the transition metal compound (A), the (B-1), and the (B-2) are brought into contact with each other, the above-described organoaluminum compound (B-1-1) is preferred as the organoaluminum compound (B-1), and the boron compound (B-2-1) or the boron compound (B-2-2) is preferred as the boron compound (B-2).

Examples of the polymerization method include a solvent polymerization method or a slurry polymerization method in which an aliphatic hydrocarbon such as butane, pentane, hexane, heptane, and octane, an aromatic hydrocarbon such as benzene and toluene, or a halogenated hydrocarbon such as methylene dichloride is used as a solvent, a vapor phase polymerization method, and a bulk polymerization method.

The temperature and the time of the polymerization reaction can be determined in consideration of the desired average molecular weight, and the degree of activity and the used amount of a catalyst. While the polymerization temperature can usually be within the range of −50° C. to 200° C., it preferably is especially within the range of −20° C. to 100° C., and the polymerization pressure usually is preferably from normal pressure to 50 MPa. Generally, the polymerization time is appropriately determined according to the desired type of polymer and the reaction apparatus. In order to adjust the molecular weight of a polymer, a chain transfer agent such as hydrogen may be added.

When a solvent is used for the polymerization reaction, the concentration of each compound in the solvent is net particularly limited. The concentration of the transition metal compound (A) in the solvent can be chosen, for example, within the range of $1 \times 10^{-8}$ mmol/L to 10 mol/L, and the concentration of the cocatalyst component (B) can be chosen, for example, within the range of $1 \times 10^{-8}$ mmol/L to 10 mol/L. The volume ratio olefin:solvent can be chosen within the range of 100:0 to 1:1000. It is noted that these ranges are examples and are not intended to be limited thereto. When no solvent is used, concentrations can be set appropriately with reference to the above-mentioned ranges.

<Resin Component (2)>

The olefin polymer as the resin component (2) is an olefin polymer having a melting peak temperature measured with DSC of within the range of 50° C. to 180° C. The melting peak temperature of the resin component (2) is determined by the same method as that used for the melting peak temperature of the resin component (1).

Examples of the olefin polymer as the resin component (2) include ethylene-α-olefin copolymers, high pressure low density polyethylene, ethylene-vinyl acetate copolymers, and polypropylene.

The ethylene-α-olefin copolymers as the resin component (2) are copolymers comprising monomer units derived from ethylene and monomer units derived from an α-olefin. Examples of the α-olefin include propylene, 1-butene, 1-pentene, 1-hexene, 1-heptene, 1-octene, 4-methyl-1-pentene, and 4-methyl-1-hexene, and these may be used individually or two or more of them may be used together. Preferred as the α-olefin are α-olefins having 4 or more carbon atoms, and 1-butene, 1-hexene, or 1-octene is more preferred.

The density of the ethylene-α-olefin copolymers and the high pressure low density polyethylene as the resin component (2) is 860 kg/m³ to 960 kg/m³.

Examples of the polypropylene as the resin component (2) include a propylene homopolymer, a propylene random copolymer, or a propylene polymeric material. The content of the monomer units derived from propylene in the polypropylene is more than 50% by weight and up to 100% by weight, where the total amount of the monomer units constituting the polypropylene is taken as 100% by weight. The polypropylene preferably has a melting point of 100° C. or higher as measured at a temperature rising rate and a temperature lowering rate of 5° C./minute in accordance with JIS K7121. Polypropylene as the resin component (2) may be a commercially available product.

Polypropylenes as the resin component (2) may be used individually or two or more of them may be used in combination.

Examples of the propylene random copolymer include propylene-ethylene random copolymers, propylene-ethylene-α-olefin random copolymers, and propylene-α-olefin random copolymers. The α-olefin is preferably an α-olefin having 4 to 10 carbon atoms and examples thereof include linear α-olefins such as 1-butene, 1-pentene, 1-hexene, 1-octene, and 1-decene, and branched α-olefins such as 3-methyl-1-butene and 3-methyl-1-pentene. Such α-olefins may be used individually or two or more of them may be used in combination.

Examples of the methods for producing a propylene homopolymer and a propylene random copolymer include publicly known polymerization methods such as a slurry polymerization method, a solution polymerization method, a bulk polymerization method, a gas phase polymerization method, etc. using a publicly known Ziegler-Natta catalyst or a catalyst based on a publicly known complex such as a metallocene complex and a non-metallocene complex The propylene polymeric material is a polymeric material composed of a propylene homopolymer component (I) and an ethylene copolymer component (II) comprising monomer units derived from at least one selected from the group consisting of propylene and α-olefins having 4 or more carbon atoms and monomer units derived from ethylene.

Examples of the α-olefin having 4 or more carbon atoms in the ethylene copolymer component (II) include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene. As the α-olefin having 4 or more carbon atoms, α-olefins having 4 to 20 carbon atoms are preferred, α-olefins having 4 to 20 carbon atoms are more preferred, and 1-butene, 1-hexene, or 1-octene is even more preferred. Such α-olefins having 4 or more carbon atoms may be used individually or two or more of them may be used in combination.

Examples of the ethylene copolymer component (II) include propylene-ethylene copolymers, ethylene-1-butene copolymers, ethylene-1-hexene copolymers, ethylene-1-octene copolymers, propylene-ethylene-1-butene copolymers, propylene-ethylene-1-hexene copolymers, and propylene-ethylene-1-octene copolymers. The ethylene copolymer component (II) may be either a random copolymer or a block copolymer.

The propylene polymeric material can be produced via multistage polymerization using a polymerization catalyst. For example, the propylene polymeric material can be produced by producing its propylene homopolymer component (I) by an earlier polymerization step and producing its ethylene copolymer component (II) by a later polymerization step.

Examples of the polymerization catalyst to be used for the production of the propylene polymeric material include Ziegler type catalyst systems, Ziegler-Natta type catalyst systems, catalyst systems composed of a Group 4 transition metal compound having a cyclopentadienyl ring and an alkyl aluminoxane, and catalyst systems composed of a Group 4 transition metal compound having a cyclopentadienyl ring, a compound capable of reacting with the transition metal compound to form an ionic complex, and an organo-aluminum compound.

A preliminarily polymerized catalyst may be used in the presence of the polymerization catalyst. Examples of the preliminarily polymerized catalyst include the catalyst systems disclosed in JP-A-61-218606, JP-A-61-287904, JP-A-5-194685, JP-A-7-216017, JP-A-9-316147, JP-A-10-212319, and JP-A-2004-182981.

Examples of the polymerization method used in the production of the propylene polymeric material include bulk polymerization, solution polymerization, slurry polymerization, and gas phase polymerization. Examples of an inert hydrocarbon solvent to be used for solution polymerization and slurry polymerization include propane, butane, isobutene, pentane, hexane, heptane, and octane. These polymerization methods may be performed in combination and also may be either in a batch mode or in a continuous mode. As the polymerization method used in the production of the propylene polymeric material, continuous gas phase polymerization and bulk-gas phase polymerization in which bulk polymerization and gas phase polymerization are performed continuously are preferred.

Preferred as the polypropylene as the resin composition (2) is a propylene homopolymer.

The resin composition (A) of the present invention can be cross-linked to afford a cross-linked product. In one embodiment, the cross-linked product is a cross-linked molded article described below, and in another embodiment, the cross-linked product is a cross-linked foam.

The cross-linked product can be produced by a method in which a resin composition (I) comprising the resin composition (A), a foaming agent, and an organic peroxide is filled into a cavity within a mold, the mold is then closed, the resin composition (I) is then pressurized while being heated, and then the mold is opened and thereby the resin composition (I) is cross-linked and foamed. The cross-linking of the resin composition (I) is performed mainly by pressurizing the resin composition (I) with the mold while heating it with the mold within the cavity, and the foaming of the resin composition (I) is performed mainly by opening the mold, thereby depressurizing within the cavity. A detailed method will be described later.

<Cross-Linked Molded Article>

In one embodiment, the cross-linked product of the present invention is a cross-linked molded article.

The cross-linked molded article of the present invention is a molded article produced by cross-linking the resin composition (A).

The cross-linked molded article of the present invention has a melting peak temperature observed with DSC of within the range of 10° C. to 50° C., a crystallization peak temperature observed with DSC of within the range of 0° C. to 400° C., and a melt enthalpy observed with DSC of 30 J/g or more. The melting peak temperature, the crystallization peak temperature, and the melt enthalpy of the cross-linked molded article are determined by the same methods as those used for the melting peak temperature, the crystallization peak temperature, and the melt enthalpy of the resin component (1).

The melting peak temperature is preferably 15° C. or higher from the viewpoint of suppressing to absorb heat more than desired under an environment, where a person feels cold. The melting peak temperature is preferably 40° C. or lower from the viewpoint of absorbing heat sufficiently under an environment where a person feels hot.

The melting peak temperature is preferably 10° C. or higher from the viewpoint of generating heat sufficiently under an environment where a person feels cold. The crystallization peak temperature is preferably 37° C. or lower from the viewpoint of suppressing to generate heat more than desired under an environment where a person feels hot.

The melt enthalpy is preferably 50 J/g or more from the viewpoint of enhancing heat storage performance. Usually, the melt enthalpy of a cross-linked molded article of an olefin polymer is 200 J/g or less.

The gel fraction of the cross-linked molded article of the present invention is 60% or more, preferably 70% or more, more preferably 80% or more, and most preferably 90% or more. Gel fraction indicates the degree of cross-linking of a cross-linked molded article; the fact that a cross-linked molded article has a high gel fraction means that more components of the resin components constituting the cross-linked molded article are cross-linked, so that a strong network structure has been formed, and also means that deformation hardly occurs due to enhanced shape retention.

Gel fraction can be determined by the method described below. A sample to be measured is put into a 100-mesh net basket, is put as it is in boiling xylene, and then is subjected to reflux operation for 8 hours. The gel remaining in the net basket is air-dried and then vacuum dried, and the resulting gel after extraction is weighed, and a gel fraction (% by weight) is calculated on the basis of the following formula using the weight of the sample put into the net basket.

$$\text{Gel fraction} = (\text{weight of gel}/\text{total weight of sample}) \times 100$$

While the shape of a cross-linked molded article is not particularly limited, a sheet shape, a shape that fits to the body such as a bed pad, a shape like beads to be filled into a pillow, etc. are enumerated, and preferred is a sheet shape.

Examples of a method for cross-linking the resin composition (A) include a method applying ionizing radiation and a method of cross-linking with an organic peroxide.

When cross-linking is performed by irradiating the resin composition (A) with ionizing radiation, the resin composition (A) is shaped into a desired shape in advance. Extrusion forming, injection molding, press molding, etc. are used preferably as the shaping method.

Examples of the ionizing radiation to be applied to a shaped sheet of the resin composition (A) include α-rays, β-rays, γ-rays, electron beams, neutron rays, and X-rays. Among these, a γ-ray of cobalt 60 or an electron beam is preferred. When the molded article of the resin composition (A) is in a sheet-like form, the ionizing radiation may be applied from at least one side.

The irradiation of ionizing radiation is performed using an ionizing radiation irradiation apparatus, and the dose of irradiation is usually 5 to 300 kGy, preferably 30 to 60 kGy. Use of the resin composition (A) can afford a cross-linked molded article having a high degree of cross-linking at a low dose of irradiation as compared with usual.

When cross-linking is per formed with ionizing radiation, a cross-linked molded article higher in degree of cross-linking can be acquired using a cross-linking aid. The cross-linking aid is an agent for increasing the degree of crosslinking of a cross-linking type thermoplastic resin composition and improving the mechanical property of the resin composition, and a compound having a plurality of double bonds in its single molecule is preferably used. Examples of the cross-linking aid include N,N'-m-phenylenebismaleimide, toluylene bismaleimide, triallyl isocyanurate, triallyl cyanurate, p-quinonedioxime, nitrobenzene, diphenylguanidine, divinylbenzene, ethylene glycol dimethacrylate, polyethylene glycol dimethacrylate, trimethylolpropane trimethacrylate, trimethylolpropane triacrylate, and allyl methacrylate. A plurality of such cross-linking aids may be used in combination.

The amount of the cross-linking aid to be added is preferably 0.01 to 4.0 parts by weight, more preferably 0.05 to 2.0 parts by weight, relative to 100 parts by weight of the total of the contents of the resin component (A) and the resin component (2).

The method for producing a cross-linked foam by using an organic peroxide can be, for example, the following production method: a method in which the resin composition (A), the organic peroxide, and, if necessary, a cross-linking aid are kneaded at a temperature equal to or lower than the decomposition temperature of the organic peroxide by a publicly known kneading method, thereby obtaining a composition, and then the resulting composition is heated and pressurized and then cooled to produce a cross-linked molded article by a publicly known shaping method. Examples of such a publicly known shaping method include extrusion forming, injection molding, and press forming.

The method for producing a cross-linked molded article using an organic peroxide can be a method in which the resin composition (A), the organic peroxide, and, if necessary, a cross-linking aid are kneaded at a temperature equal to higher than the decomposition temperature of the organic peroxide by a publicly known kneading method, thereby obtaining a composition, and then the resulting composition is processed into a cross-linked molded article by a publicly known shaping method.

Examples of such a publicly known shaping method include extrusion forming, injection molding, and press forming. To knead the resin composition (A), the organic peroxide, and, if necessary, a cross-linking aid are kneaded at a temperature equal to higher than the decomposition temperature of the organic peroxide is called dynamic heat treatment or dynamic cross-linking.

Examples of a melt-kneading apparatus to be used for dynamic heat treatment or dynamic cross-linking include publicly known apparatus such as a twin screw extruder and a Banbury mixer. Dynamic heat treatment or dynamic cross-linking is described in detail in documents including Thermoplastic Elastomers 2nd ed., 153-190 (Hanser Gardner Publications, 1996).

The temperature in the dynamic heat treatment or the dynamic cross-linking is usually 100° C. to 250° C. and the times of the dynamic heat treatment or the dynamic cross-linking is usually 1 minute to 30 minutes. In the kneading in the dynamic heat treatment or the dynamic cross-linking, all components may be kneaded at once or some components may be kneaded, followed by adding and kneading the remaining components; the kneading may be performed either once or twice or more.

When the total amount of the resin component (1) and the resin component (2) is taken as 100% by weight, the content of the resin component (1) in the resin composition (A) to be subjected to dynamic heat treatment or dynamic cross-linking is 30% by weight to 90% by weight and the content of the resin component (2) is 1% by weight to 70% by weight. In order to improve the shape retention of a molded article, the content of the resin component (2) is preferably 5% by weight or more, more preferably 10% by weight or more, even more preferably 15% by weight or more. In order to improve the heat storage property of a molded article, the content of the resin component (2) is preferably 50% by weight or less, more preferably 40% by weight or less, even more preferably 30% by weight or less.

When cross-linking with an organic peroxide, an organic peroxide having a decomposition temperature equal to or higher than the flow onset temperatures of the resin component (1) and the resin component (2) is suitably used, and examples thereof include dicumylperoxide, 2,5-dimethyl-2,5-di-tert-butylperoxyhexane, 2,5-dimethyl-2,5-di-tert-butylperoxyhexyne, α,α-di-tert-butylperoxyisopropylbenzene, tert-butylperoxy-2-ethylhexyl carbonate, and tert-hexylperoxyisopropyl monocarbonate.

An organic peroxide having a low decomposition temperature is preferred from the viewpoint of lowering the processing temperature, and tert-hexylperoxyisopropyl monocarbonate is preferred.

In the step of producing a cross-linked molded article, publicly known additives may be included in the resin composition (A), if necessary. Examples of such additives include flame retardants, antioxidants, weathering agents, lubricants, antiblocking agents, antistatic agents, anticlouding agents, antidripping agents, pigments, and fillers. Such additive components can be added by kneading them with the resin composition (A) before performing cross-linking treatment.

<Cross-Linked Foam>

In one embodiment, the cross-linked product of the present invention is a cross-linked foam.

The cross-linked foam of the present invention is a foam produced by cross-link foaming the resin composition (A).

The cross-linked foam of the present invention has a melting peak temperature observed from its melting curve of within the range of 10° C. to 50° C., a crystallization peak temperature observed from its crystallization of within the range of 0° C. to 40° C., and a melt enthalpy determined from its melting curve of 30 J/g or more.

The melting peak temperature of the cross-linked foam is preferably 15° C. or higher from the viewpoint of suppressing to absorb heat more than desired under an environment where a person feels cold. The melting peak temperature is preferably 40° C. or lower from the viewpoint of absorbing heat sufficiently under an environment where a person feels hot.

The crystallization peak temperature of the cross-linked foam is preferably 10° C. or higher from the viewpoint of generating heat sufficiently under an environment where a person feels cold. The crystallization peak temperature is preferably 37° C. or lower from the viewpoint of suppressing to generate heat more than desired under an environment where a person feels hot.

The melt enthalpy of the cross-linked foam is preferably 50 J/g or more from the viewpoint of enhancing heat storage-performance and heat insulating property. Usually, the melt enthalpy of the cross-linked foam is 200 J/g or less.

The aforementioned melting peak temperature, the crystallization peak temperature, and the melt enthalpy of the cross-linked foam of the present invention are values determined by the following methods.

Using a differential scanning calorimeter (for example, a differential scanning calorimeter DSC-7 manufactured by PerkinElmer), an aluminum pan containing about 10 mg of sample, for example, is subjected to: (1) holding at 150° C. for 5 minutes, (2) lowering the temperature from 150° C. to 0° C. at a rate of 5° C./minute, (3) holding at 0° C. for 2 minutes, (4) raising the temperature from 0° C. to 150° C. at a rate of 5° C./minute, and the DSC curve obtained in the measurement of (2) is a crystallization curve, and the DSC curve obtained in the measurement of (4) is a melting curve. The crystallization peak temperature is a temperature at which the amount of heat generated is largest in a curve obtained by subtracting a blank line from the crystallization curve. The melting peak temperature is a temperature at which the amount of heat absorbed is largest in a curve obtained by subtracting a blank line from the melting curve. The melt enthalpy ΔH (J/g) is determined by converting integral of the curve obtained by subtracting the blank line from the melting curve into an amount of heat, and dividing the resulting amount of heat by the weight of the sample subjected to the measured. When the melting curve and the crystallization curve are broad and the blank line is not stable enough, the temperature range to measure may be broaden than the above-mentioned measurement temperature range of 0° C. to 150° C. When a foam cannot be put into a aluminum pan for measurement, it can be put into the aluminum pan after being shaped into a press sheet by heating.

The gel fraction of the cross-linked foam of the present invention is 60% or more, preferably 70% or more, more preferably 80% or more. Gel fraction indicates the degree of cross-linking of a cross-linked foam; the fact that a cross-linked foam has a high gel fraction means that components of the resin components constituting the cross-linked foam are cross-linked, so that a strong network structure has been formed, and also means that shape retention has been enhanced and deformation hardly occurs.

Gel fraction can be determined by the method described below. A sample to be measured is put into a 100-mesh net basket, then put into boiling xylene as it is, and then subjected to reflux operation for 8 hours. The gel remaining in the net basket is air-dried and then vacuum dried, and the resulting gel after extraction is weighed, and a gel fraction (% by weight) is calculated on the basis of the following formula using the weight of the sample put into the net basket.

Gel fraction=(weight of gel/total weight of sample)×100

The shape of the cross-linked foam of the present invention can be, for example, a sheet shape, a shape that fits to the body such as a bed pad, a shape like beads to be filled into a pillow, etc., and preferred is a sheet shape.

The method for producing a cross-linked foam can be any method, and extrusion foam forming, injection foam molding, compression foam molding, etc. are suitably used.

In the compression foam molding method, (1) a resin composition is filled into a cavity within a mold, (2) the resin composition within the mold is heated while being pressurized (with an increased pressure maintained) with a pressing machine or the like, thereby decomposing a cross-linking agent and a foaming agent, (3) depressurizing the mold and taking a cross-linked foam out of the mold. The time, the temperature, and the pressure for performing the heating under pressure during the step (2) are determined according to the depth of the cavity within the mold to be used, the types and the amounts of the cross-linking agent and the foaming agent, etc.

Examples of the method for producing the cross-linked foam of the present invention include a method in which a cross-linked foam is produced by filling a resin composition (I) comprising the resin composition (A) of the present invention, a foaming agent, and an organic peroxide into a cavity within a mold, pressurizing it within the mold while heating at a temperature equal to or higher than the one-minute half-life temperature of the organic peroxide, and then opening the mold (this method is hereinafter referred to as the first method), and a method in which a cross-linked foam is produced by irradiating a resin composition (II) comprising the resin composition (A) of the present invention and a foaming agent with an ionizing radiation, thereby producing a cross-linked molded article, and then heating the cross-linked molded article (this method is hereinafter referred to as the second method).

The first method is described concretely below.

The organic peroxide can be an organic peroxide that can be used for the production of the cross-linked molded article of the present invention.

It is preferred to melt-knead the resin composition (I) comprising the resin composition (A), the foaming agent, and the organic peroxide at a temperature that is lower than the decomposition temperature of the foaming agent, and lower than the one-minute half-life temperature of the organic peroxide, and then heat it at a temperature that is equal to or higher than the one-hour half-life temperature of the organic peroxide and equal to or higher than the decomposition temperature of a heat decomposition-type foaming agent.

The second method is described concretely below.

The ionizing radiation with which the resin composition comprising the resin composition (A) of the present invention and the foaming agent is to be irradiated can be the same ionizing irradiation as that to be used for the production of the cross-linked molded article of the present invention. The irradiation method and the dose of the ionizing radiation can be the same as the method and the dose disclosed as the irradiation method and the dose used in the production of the cross-linked molded article of the present invention.

The resin composition (II) comprising the resin composition (A) of the present invention and a foaming agent is usually irradiated with ionizing radiation after being shaped into a desired shape at a temperature lower than the decomposition temperature of the foaming agent. Examples of the method of shaping into a sheet include a method of shaping into a sheet shape with a calendar roll, a method of shaping into a sheet shape with a press forming machine, and a method of shaping into a sheet shape by melt-extruding through a T die or a circular die.

The method of producing a cross-linked foam by heating a resulting cross-linked molded article to be applied can be any publicly known method, and methods by which heating and foaming treatment can continuously be applied to a cross-linked molded article, such as a vertical hot air foaming method, a horizontal hot air foaming method, and horizontal chemical foaming method, are preferred. The heating temperature is a temperature equal, to or higher than the decomposition temperature of the foaming agent, and preferably is a temperature 5 to 50° C. higher than the decomposition temperature of a heat decomposition-type foaming agent.

The heating time is usually 3 to 5 minutes in the case of heating in an oven.

Publicly known physical foaming agent or heat decomposition-type foaming agents can be used as the foaming agent in the resin composition (I) or the resin composition (II). Two or more foaming agents may be used in combination.

Examples of physical foaming agents include air, oxygen, nitrogen, carbon dioxide, ethane, propane, n-butane, isobutane, n-pentane, isopentane, n-hexane, isohexane, cyclohexane, heptane, ethylene, propylene, water, petroleum ether, methyl chloride, ethyl chloride, monochlorotrifluoromethane, dichlorodifluoromethane, and dichlorotetrafluoroethane. Among these, use of carbon dioxide, nitrogen, n-butane, isobutane, n-pentane, or isopentane is preferred from the viewpoints of economical efficiency and safety.

Examples of the heat decomposition type foaming agent include inorganic foaming agents, such as sodium carbonate; and organic foaming agents, such as azodicarbonamide, N,N-dinitropentamethylenetetramine, p,p'-oxybisbenzenesulfonylhydrazide, and hydrazodicarbonamide. Among these, use of azodicarbonamide, sodium hydrogencarbonate, or p,p'-oxybisbenzenesulfonylhydrazide is preferred from the viewpoints of economical efficiency and safety. It is more preferred to use a foaming agent comprising azodicarbonamide and sodium hydrogencarbonate because the molding temperature range is wide or there can be acquired a cross-linked foam having fine bubbles.

When a heat decomposition type foaming agent is used, a heat decomposition type foaming agent whose decomposition temperature is 120 to 240° C. is usually used. When a heat decomposition type foaming agent having a decomposition temperature of higher than 200° C., it is preferred to use the foaming agent in combination with a foaming aid and thereby lower its decomposition temperature to 200° C. or lower. Examples of the foaming aid include metal oxides, such as zinc oxide and lead oxide; metal carboxylates, such as zinc carbonate; metal chlorides, such as zinc chloride; urea; metal soaps, such as zinc stearate, lead stearate, dibasic lead stearate, zinc laurate, zinc 2-ethylhexoate, and dibasic lead phthalate; organotin compounds, such as dibutyltin dilaurate and dibutyltin dimaleate; and inorganic salts, such as tribasic lead sulphate, dibasic lead phosphite, and basic lead sulfite.

A masterbatch composed of a heat decomposition type foaming agent, a foaming aid, and a resin can be used as the heat decomposition type foaming agent. While the type of the resin to be used for the masterbatch is not particularly limited, the resin component (1) or the resin component (2) of the present invention is preferred. The total amount of the heat decomposition type foaming agent and the foaming aid contained in the masterbatch is usually 5% by weight to 90% by weight, where the amount of the resin contained in the masterbatch is taken as 100% by weight.

In order to acquire a cross-linked foam having finer bubbles, it is preferred to use a foam nucleating agent together with a foaming agent. Examples of the foam nucleating agent include inorganic fillers, such as talc, silica, mica, zeolite, calcium carbonate, calcium silicate, magnesium carbonate, aluminum hydroxide, barium sulfate, aluminosilicate, clay, quartz powder, and diatomite; beads having a particle diameter of 100 μm or less made of polymethyl methacrylate, polystyrene or the like; metal salts, such as calcium stearate, magnesium stearate, zinc stearate, sodium benzoate, calcium benzoate, aluminum benzoate, and magnesium oxide; two or more of them may be combined.

Although the amount of the foaming agent in the resin composition (I) or the resin composition (II) is appropriately determined on the basis of the type of the foaming agent to be used and the expansion ratio of a cross-linked foam to produce, it is usually 1 to 100 parts by weight relative to 100 parts by weight of the resin composition (A) of the present invention.

In order to increase the expansion ratio or the strength of the cross-linked foam of the present invention, it is preferred that the resin composition (I) or the resin composition (II) further contain a cross-linking aid. The cross-linking aid can be a cross-linking aid to be used for the production of the cross-linked molded article of the present invention. The amount of the cross-linking aid is preferably 0.01 to 4.0 parts by weight, more preferably 0.05 to 2.0 parts by weight, relative to 100 parts by weight of the resin composition (A).

The resin composition (I) or the resin composition (II) can contain publicly known additives, such as a crosslinking agent, a heat-resistant stabilizer, a weathering stabilizer, a pigment, a filler, a lubricant, an antistatic agent, and a flame retardant, if necessary.

When the resin composition (I) or the resin composition (II) contains a publicly known additive, the resin composition (I) or the resin composition (II) is preferably one in which the publicly known additive has been melt-knead. Examples of the method of melt-kneading include, for example, a method in which components are mixed with a tumbler blender, a Henschel mixer, or the like and then are melt-kneaded with a single screw extruder, a multiple screw extruder, or the like or a method in which the components are melt-kneaded with a kneader, a Banbury mixer, or the like.

The resin composition of the present invention, a cross-linked molded article of the resin composition, and a cross-linked foam of the resin composition are excellent in heat storage performance, molding processability, and shape retention, and it can be use for products with which hot insulation or cold insulation performance is required.

The resin composition (A) of the present invention, a cross-linked molded article of the resin composition (A), and a cross-linked foam of the resin composition (A) are excellent in heat storage performance, molding processability, and shape retention, and it can be use for products with which hot insulation or cold insulation performance is required.

For example, there can be expected use in a variety of fields, such as common construction materials or components thereof; components of air conditioning equipment in residences, hotels, airports, underground shopping centers, etc., warm air systems, canisters, and interior materials of automobiles; electronic parts; household electric appliances, such as refrigerators; heat reserving reservoirs for medical use such as organ transportation; road reflecting mirrors; concrete materials of bridges; hotboxes or containers for food distribution; lunchboxes or tableware; common garments, such as snowsuits and sportswear; components of products for maintaining the body temperature, such as bedding, toilet seats, heating pads; and components of heat reserving items for maintaining hot water at a constant temperature, such as water-bottles and bathtubs.

Examples of the common construction materials or components thereof include applications to components such as floor heaters, wallplates, ceiling materials, wallpaper, heat insulating materials, and roof materials. It can be used in the form of a laminate with a heat insulating material having no heat storage performance.

Examples of the warming systems of automobiles include applications to heat storage apparatuses using latent heat storage materials capable of storing heat in a super-cooled state in order to effectively perform warming-up of internal combustion engines mounted on automobiles or the like.

In the case of electronic parts, for example, in electronic parts mounted in electronic devices, they can be used in lamination with heat diffusion films or the like from the viewpoint of suppressing temperature elevation of heat generators, or alternatively, they can be used by being stuck to housings surrounding heating elements from the viewpoint of the countermeasure against cold burns.

Examples of attachment points include sites that require heat shielding of electronic devices, such as personal computers, tablet PCs, PDAs, mobile phones, and digital cameras, information devices, such as printers, copiers, and projectors, and cooking appliances, such as hot water dispensers, microwave ovens, and water heaters.

EXAMPLES

Physical properties in examples were measured according to the following methods.
(1) Density (Unit: kg/m$^3$) of Resin Component (1)
The density of an olefin polymer was measured in accordance with the method provided for in Method A of JIS K7112-1980.
(2) Melting Peak Temperature (Tm, Unit: ° C.), Crystallization Peak Temperature (Tc, Unit: ° C.), and Melt Enthalpy (ΔH, Unit: J/g) of Resin Component (1), Cross-Linked Foam, and Dynamically Cross-Linked Resin Composition
Measurement was performed by the method described below using a thermal analyzer, a differential scanning calorimeter (Diamond DSC, manufactured by PerkinElmer). In subjecting under a nitrogen atmosphere an aluminum pan containing about 10 mg of sample to: (1) holding at 150° C. for 5 minutes, (2) lowering the temperature from 150° C. to 0° C. at a rate of 5° C./minute, (3) holding at 0° C. for 5 minutes, and (4) raising the temperature from 0° C. to 150° C. at a rate of 5° C./minute, the differential scanning calorimetry curve obtained in the measurement of (2) was taken as a crystallization curve, and the differential scanning calorimetry curve obtained in the measurement of (4) was taken as a melting curve. The crystallization peak temperature is a temperature at which the amount of heat generated is largest in a curve obtained by subtracting a blank line from the crystallization curve. The melting peak temperature is a temperature at which the amount of heat absorbed is largest in a obtained by subtracting a blank line from the melting curve.

The ΔH (J/g) was determined by converting the integral of the curve by subtracting the blank line from the melting curve into an amount of heat, and dividing the resulting amount of heat by the weight of the sample subjected to the measurement.
(3) Intrinsic Viscosity ([η], Unit: dl/g) of Resin Component (1)
A sample solution produced by dissolving 100 mg of an olefin polymer at 135° C. in 100 ml of tetralin containing 5% by weight of butylhydroxytoluene (BHT) as a heat degradation inhibitor and a blank solution composed of only 100 ml of tetralin containing 0.5% by weight of BHT were prepared. The relative viscosity (ηrel) of the olefin polymer was determined from the fall times of the sample solution and the blank solution measured using a Ubbelohde viscometer, and then [η] was calculated using formula (1).

[η]=23.3×log(ηrel)    (I)

(4) The Number of Branch Chains Having 5 or More Carbon Atoms of Resin Component (1) Per 1000 Carbon Atoms
A carbon nuclear magnetic resonance spectrum ($^{13}$C-NMR) was measured under the following measurement conditions by a carbon nuclear magnetic resonance spectrometry, and then the number of branch chains having 5 or more carbon atoms was calculated by the following calculation method.
<Measurement Conditions>
Instrument: AVANCE600 manufactured by Bruker
Measurement solvent: mixed solvent of 1,2-dichlorobenzene/1,2-dichlorobenzene-d4=75/25 (volumetric ratio)
Measurement temperature: 130° C.
Measurement method: proton decoupling method
Pulse width: 45 degrees
Pulse repetition time: 4 seconds
Measurement standard: tetramethylsilane
Window function: negative exponential function
<Calculation Method>
Taking the sum total of the area of all peaks observed from 5 to 50 ppm as 1000, the total of the peak area of a peak having a peak top in the vicinity of 38.20 to 39.0 ppm and the peak area of a peak having a peak top in the vicinity of 35.8 to 36.5 ppm was calculated as the number of branch chains having 5 or more carbon atoms per 1000 carbon atoms.
(7) Gel Fraction of Cross-Linked Foam (Unit: % by Weight)
About 1 g of a sample to be measured was put into a 100-mesh net basket, then put into boiling xylene as it was, and then subjected to reflux operation for 8 hours. The gel remaining in the net basket was air-dried and then vacuum dried. The gel after extraction was weighed, and a gel fraction (% by weight) was calculated on the basis of the following formula.

Gel fraction=(weight of gel/total weight of sample)×100

(9) Expansion Ratio of Cross-Linked Foam (Unit: Time)
An expansion ratio was calculated using the following formula from the density of the olefin polymer determined by the method described in (1) above and the density of the cross-linked foam determined by the method described in (8) above.

Expansion ratio=the density of olefin polymer/the density of cross-linked foam

(10) Melt Flow Rate (MFR; Unit: g/10 Minutes)
In accordance with JIS K7210, polypropylene resins were measured at a load of 21.18 N and a temperature of 230° C., and dynamically cross-linked resin compositions were measured at a load of 98.07 N and a temperature of 230° C.
(11) Shape Retention of Molded Article of Dynamically Cross-Linked Resin Composition (70° C.)
A molded article of a dynamically cross-linked resin composition (3 cm in diameter, 1.3 cm in thickness) was prepared, and change in its shape after being left at a temperature of 70° C. for 22 hours was judged visually. Any case where there was no change in shape is expressed by symbol "○", whereas any case where the shape changed significantly is expressed by "x".
Production of Olefin Polymer (Polymer PE-1)
To a 3-liter autoclave equipped with a stirrer, dried under reduced pressure and then purged with nitrogen was added a toluene solution of LINEALENE 2024 (a mixture of α-olefins having 18 carbon atoms, 20 carbon atoms, 22 carbon atoms, and 24 carbon atoms, respectively, produced by Idemitsu Kosan Co., Ltd.) (0.48 g/mL, 500 mL), and subsequently, toluene was added so that the liquid amount might become 1500 mL. The temperature of the autoclave was raised to 60° C., and then ethylene was added so that its partial pressure might become 0.5 MPa, thereby stabilizing the system. A hexane solution of triisobutylaluminum (1.0 mol/L, 1.5 ml) was added thereto. To this was charged a mixture prepared by keeping a toluene solution of diethylsilylene(tetramethylcyclopentadienyl)(3-tert-butyl-5-methyl-2-phenoxy)titanium dichloride (1 mmol/L, 0.5 mL) in contact with a hexane solution of triisobutylaluminum (1.0 mol/L, 0.5 ml) for 1 minute. Subsequently, a toluene solution of dimethylanilinium tetrakis(pentafluorophenyl)borate (1.0 mol/L, 7.5 ml) was charged to initiate polymerization, and then ethylene gas was fed so as to keep the total pressure constant. After a lapse of 90 minutes, 2 ml of ethanol was added, thereby stopping the polymerization. After the stop of the polymerization, an olefin polymer was deposited by adding a toluene solution containing the polymer into acetone, and the olefin polymer collected by filtration was further washed with acetone twice. The resulting olefin polymer was vacuum dried at 80° C., thereby acquiring 207 g of an olefin polymer (hereinafter referred to as polymer PE-1). The analytical values of the resulting polymer PE-1 are shown below.

Density=856 kg/m$^3$, the number of branches having 5 or more carbon atoms per 1000 carbon atoms=32, [η]=1.9 dl/g, ΔH=86 J/g, Tm=31° C., Tc=24° C.

[Example 1] Cross-Linked Foam

The polymer PE-1 as the resin component (1) in an amount of 90% by weight, and 10% by weight of an ethylene-α-olefin copolymer (produced by Sumitomo Chemical Co., ltd., trade name: EXCELLEN GMH, CB0002, Tm=102° C., density=913 kg/m$^3$) as the resin component (2) were kneaded by using a kneading machine (Labe Plastomill 30C150 manufactured by Toyo Seiki Seisaku-sho, Ltd., mixer R-100H) under conditions including a resin temperature during kneading of 120° C., a kneading time of 10 minutes, and a screw rotation speed of 50 to 70 rpm, thereby acquiring a resin composition (A).

Subsequently, 1.0 part, by weight of t-hexylperoxyisopropyl monocarbonate (produced by NOF Corporation, trade name: PERHEXYL I, one-minute half-life temperature: 155° C.), 25 parts by weight of an ACCA-based heat decomposition-type composite foaming agent (produced by Sankyo Kasei Co., Ltd., trade name: CELLMIC CAP), 2.0 parts by weight of zinc stearate, and 1.0 part by weight of zinc oxide, based on 100 parts by weight of the overall amount of the resulting resin composition (A), were kneaded by using a kneading machine (Labo Plastomill 30C150 manufactured by Toyo Seiki Seisaku-sho, Ltd., mixer R-100H) under conditions including a resin temperature during kneading of 100° C., a kneading time of 10 minutes, and a screw rotation speed of 50 to 70 rpm, thereby acquiring a resin composition (II). The resin composition (II) was filled into a mold sized 10 cm×10 cm×1 cm and then heated and pressurized under conditions including a temperature of 125° C., a time of 30 minutes, and a pressure of 20 MPa, and then the mold was released with the mold temperature maintained at 125° C., thereby acquiring a cross-linked foam. The resulting cross-linked foam was 25 cm×25 cm×2.5 cm in size. The analytical values of the resulting cross-linked foam are shown below.

Tm=34° C., ΔH=54 J/g, Tc=30° C., gel fraction=88%.

[Comparative Example 1] Cross-Linked Foam 1.5 parts by weight of dicumylperoxide (one-minute half-life temperature: 175° C.), 10 parts by weight of a heat decomposition-type foaming agent, azodicarbonamide (produced by EIWA CHEMICAL IND. CO., LTD., trade name: VTNYFOR AC#3), 2.5 parts by weight of urea (produced by EIWA CHEMICAL IND. CO., LTD., trade name: CELLPASTE 101), 2.0 parts by weight of zinc stearate, and 1.0 part by weight of zinc oxide, based on 100 parts by weight of the overall amount of the polymer PE-1, were kneaded by using a kneading machine (Labo Plastomill 30C150 manufactured by Toyo Seiki Seisaku-sho, Ltd., mixer R-100H) under conditions including a resin temperature during kneading of 100° C., a kneading time of 10 minutes, and a screw rotation speed of 50 to 70 rpm, thereby acquiring a resin composition. The resin composition was filled into a mold sized 10 cm×10 cm×1 cm and then heated and pressurized under conditions including a temperature of 155° C., a time of 30 minutes, and a pressure of 20 MPa, and then the mold was released with the mold temperature maintained at 155° C., but it was not expanded and no foam was acquired.

Production of Olefin Polymer (Polymer PE-2)

To a 5-liter autoclave equipped with a stirrer, dried under reduced pressure and then purged with nitrogen was added 1.4 L of a toluene solution containing 706 g of AlphaOlefin C2024 (a mixture of olefins having 18 carbon atoms, 20 carbon atoms, 22 carbon atoms, 24 carbon atoms, and 26 carbon atoms, respectively, produced by INEOS), and subsequently, toluene was added so that the liquid amount might become 3 L. The temperature of the autoclave was raised to 60° C., and then ethylene was added so that its partial pressure might become 0.1 MPa, thereby stabilizing the system. A hexane solution of triisobutylaluminum (0.34 mol/L, 14.7 ml) was added thereto. Subsequently, a toluene solution of dimethylanilinium tetrakis(pentafluorophenyl) borate (1.0 mmol/13.4 mL) and a toluene solution of diphenylmethylene(cyclopentadienyl)(fluorenyl)zirconium dichloride (0.2 mmol/L, 7.5 mL) were charged to initiate polymerization, and then ethylene gas was fed so as to keep the total pressure constant. After a lapse of 3 hours, 2 ml of ethanol was added, thereby stopping the polymerization. After the stop of the polymerization, an olefin polymer was deposited by adding a toluene solution containing the polymer into acetone, and the olefin polymer collected by filtration was further washed with acetone twice. The resulting olefin polymer was vacuum dried at 80° C., thereby acquiring 369 g of an olefin polymer (hereinafter referred to as polymer PE-2). The analytical values of the resulting polymer PE-2 are shown below.

The number of branches having 5 or more carbon atoms per 1000 carbon atoms=30, [η]=1.2 dl/g, ΔH=89 J/g, Tm=34° C., Tc=33° C.

[Example 2] Dynamically Cross-Linked Resin Composition

The polymer PE-2 as the resin component (1) in an amount of 80% by weight, 20% by weight of a polypropylene resin (Noblene Y501N, Tm=161° C., MFR (at 230° C., 21.18 N)=13 g/10 minutes, produced by Sumitomo Chemical Co., Ltd.) as the resin component (2), and 1.5 parts by weight of a cross-linking aid (Hi-Cross MS50 (a mixture prepared by diluting trimethylolpropane trimethacrylate to 50% with silicon dioxide), produced by Seiko Chemical Co., Ltd.) and 0.1 parts by weight of an antioxidant (IRGANOX 1010 (phenolic antioxidant), produced by Ciba Japan K.K.), based on 100 parts by weight of the total amount, of the resin component (1) and the resin component (2), were kneaded at a resin temperature during kneading of 200° C. for 5 minutes by using a kneading machine (Labo Plastomill 30C150, mixer R-100H), and then 2.0 parts of a cross-linking agent (APO-40S (a mixture prepared by diluting 2, 5-dimethyl-2,5-di(t-butylperoxy)hexane to 40% with silicon dioxide), produced by Kayaku Akzo Corporation) was added and kneading was further performed at 200° C. for 5 minutes, thereby acquiring a dynamically cross-linked resin composition.

The resulting resin composition had an MFR (at 230° C., 98.07 N) of 12 g/10 minutes, a ΔH of 74 J/g, a Tm of 36° C., and a Tc of 30° C. The shape retention of the molded article was "○".

[Example 3] Dynamically Cross-Linked Resin Composition

An experiment was performed as in Example 2 expect that the cross-linking aid Hi-Cross MS50 was used in art amount of 0.75 parts by weight and the cross-linking agent APO-40S was used in an amount of 1.0 part by weight, thereby acquiring a dynamically cross-linked resin composition.

The resulting resin composition had an MFR (at 230° C., 98.07 N) of 17 g/10 minutes, a ΔH of 79 J/g, a Tm of 36° C., and a Tc of 31° C. The shape retention of the molded article was "○".

[Example 4] Dynamically Cross-Linked Resin Composition

An experiment was performed as in Example 2 expect that Noblene H501 (Tm=165° C., MFR (at 230° C., 21.18 n)=3.2 g/10 minutes, produced by Sumitomo Chemical Co., Ltd.) was used as a polypropylene resin as the resin component (2) in Example 2, thereby acquiring a dynamically cross-linked resin composition.

The resulting resin composition had an MFR (at 230° C., 98.07 N) of 10 g/10 minutes, a ΔH of 75 J/g, a Tm of 36° C., and a Tc of 30° C. The shape retention of the molded article was "○".

[Example 5] Dynamically Cross-Linked Resin Composition

An experiment was performed as in Example 2 expect that Noblene U101E9 (Tm=163° C., MFR (at 230° C., 21.18 n)=120 g/10 minutes, produced by Sumitomo Chemical Co., Ltd.) was used as a polypropylene resin as the resin component (2) in Example 2, thereby acquiring a dynamically cross-linked resin composition.

The resulting resin composition had an MFR (at 230° C., 98.07 N) of 16 g/10 minutes, a ΔH of 73 J/g, a Tm of 36° C., and a Tc of 30° C. The shape retention of the molded article was "○".

[Example 6] Dynamically Cross-Linked Resin Composition

The polymer PE-2 as the resin component (1) in an amount of 80% by weight, 20% by weight of a polypropylene resin (Noblene Y501N) the resin component (2), and 0.75 parts by weight of a cross-linking aid (Hi-Cross MS50) 0.1 parts by weight of an antioxidant (IRGANOX 1010) and 1.0 part by weight of a cross-linking agent (APO-40S), based on 100 parts by weight of the total amount of the resin component (1) and the resin component (2), were kneaded at a resin temperature during kneading of 200° C. for 10 by using a kneading machine (Labo Plastomill 30C150, mixer R-100H), thereby acquiring a dynamically cross-linked resin composition.

The MFR (at 230° C., 98.07 N) of the resulting resin composition was 16 g/10 minutes, and the shape retention of the molded article was "○".

Example 7

The polymer PE-2 as the resin component (I) in an amount of 90% by weight, 10% by weight of a polypropylene resin (Noblene Y501N) as the resin component 12), and 0.75 parts by weight of a cross-linking aid (Hi-Cross MS50) and 0.1 parts by weight of an antioxidant (IRGANOX 1010), based on 100 parts by weight of the total amount of the resin component (1) and the resin component (2), were kneaded at a resin temperature during kneading of 200° C. for 5 minutes by using a kneading machine (Labo Plastomill 30C150, mixer R-100H), and then 1.0 part of a cross-linking agent (APO-40S) was added and kneading was further performed at 200° C. for 5 minutes, thereby acquiring a dynamically cross-linked resin composition.

The MFR (at 230° C., 98.07 N) of the resulting resin composition was 12 g/10 minutes, and the shape retention of the molded article was "○".

[Comparative Example 2] Resin Composition

The polymer PE-2 as the resin component (1) in an amount of 80% by weight, a polypropylene resin (Noblene Y501N) as the resin component (2), and 0.1 parts by weight of an antioxidant (IRGANOX 1010), based on 100 parts by weight of the total amount of the resin component (1) and the resin component (2), were kneaded at a resin temperature during kneading of 200° C. for 10 minutes by using a Labo Plastomill kneading machine, thereby acquiring a resin composition. Neither a cross-linking agent nor a cross-linking aid was used.

The shape retention of the molded article was "x".

[Comparative Example 3] Dynamically Cross-Linked Resin Composition

The polymer PE-2 as the resin component (1), 0.75 parts by weight of a cross-linking aid (Hi-Cross MS50), and 0.1 parts by weight of an antioxidant (IRGANOX 1010), based on 100 parts by weight of the amount of the resin component (1), were kneaded at a resin temperature during kneading of 200° C. for 5 minutes by using a Labo Plastomill kneading machine and then 1.0 part of a cross-linking agent (APO-40S) was added and kneading was further performed at 200° C. for 5 minutes, thereby acquiring a resin composition. No resin component (2) was used.

The shape retention of the molded article was "x".

INDUSTRIAL APPLICABILITY

According to the present invention, there can be provided a resin composition capable of easily affording a cross-linked foam excellent in heat storage performance, a cross-linked product of the resin composition, and a method for producing the cross-linked product.

The invention claimed is:

1. A resin composition (A) comprising a resin component (1) defined below and a resin component (2) defined below, wherein the content of the resin component (1) is 30% by weight to 99% by weight and the content of the resin component (2) is 1% by weight to 70% by weight where the total amount of the resin component (1) and the resin component (2) is taken as 100% by weight, resin component (1):
an olefin polymer comprising a main chain containing monomer units derived from ethylene and branch chains having 5 or more carbon atoms, the number of the branch chains being within the range of 20 chains to 40 chains per 1000 carbon atoms constituting the olefin polymer, and having a melting peak temperature measured with DSC of within the range of 10° C. to 50° C., a crystallization peak temperature measured with DSC of within the range of 0° C. to 40° C., and a melt enthalpy measured with DSC of 50 J/g or more, resin component (2):
an olefin polymer having a melting peak temperature measured with DSC of within the range of 50° C. to 180° C.

2. A cross-linked product obtained by cross-linking the resin composition (A) according to claim 1 and having a melting peak temperature measured with DSC of within the range of 10° C. to 50° C., a crystallization temperature measured with DSC of within, the range of 0° C. to 40° C., and a melt enthalpy measured with DSC of 30 J/g or more.

3. A method for producing the cross-linked product according to claim 2, in which a resin composition (I) comprising the resin composition (A), a foaming agent, and an organic peroxide is filled into a cavity within a mold, the mold is then closed, the resin composition (I) is then pressurized while being heated, and then the mold is opened and thereby the resin composition (I) is cross-linked and foamed.

* * * * *